US012566604B2

(12) United States Patent (10) Patent No.: US 12,566,604 B2
Pathak et al. (45) Date of Patent: Mar. 3, 2026

(54) SOFTWARE APPLICATION EXECUTION USING CONTEXTUAL INFORMATION

(71) Applicant: DocuSign, Inc., San Francisco, CA (US)

(72) Inventors: Avanish Pathak, Rochester, NY (US); Mark Peterson, Bellevue, WA (US)

(73) Assignee: Docusign, Inc., San Francisco, CA (US)

( * ) Notice: Subject to any disclaimer, the term of this patent is extended or adjusted under 35 U.S.C. 154(b) by 152 days.

(21) Appl. No.: 18/345,815

(22) Filed: Jun. 30, 2023

(65) Prior Publication Data

US 2025/0004758 A1    Jan. 2, 2025

(51) Int. Cl.
G06F 9/44 (2018.01)
G06F 8/61 (2018.01)
(Continued)

(52) U.S. Cl.
CPC ................. G06F 8/71 (2013.01); G06F 8/61 (2013.01); G06F 9/44526 (2013.01); G06F 9/451 (2018.02)

(58) Field of Classification Search
CPC .......... G06F 8/71; G06F 8/61; G06F 9/44526; G06F 9/451; G06F 40/166; G06F 21/64;
(Continued)

(56) References Cited

U.S. PATENT DOCUMENTS 8,595,186 B1    11/2013  Mandyam et al.
8,769,490 B2 *   7/2014  Poulsen .................... G06F 8/61
                                                                717/114
(Continued)

FOREIGN PATENT DOCUMENTS

CN         101827123 A    9/2010
WO      2013071193 A1    5/2013

OTHER PUBLICATIONS

U.S. Appl. No. 18/345,799, filed Jun. 30, 2023, naming inventors Pathak et al.
(Continued)

*Primary Examiner* — Thuy Dao
(74) *Attorney, Agent, or Firm* — Shumaker & Sieffert, P.A.

(57)                              ABSTRACT
Techniques are described for deploying software applications associated with document management. The techniques may include receiving a request, by a computing system and from a client device, to execute a software application for managing an electronic document, wherein the software application is configured to execute using at least a first widget and a second widget. The techniques may further include generating, based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget. The techniques may further include outputting, by the computing system and to the client device, the instructions to execute the software application for managing the electronic document.

20 Claims, 12 Drawing Sheets

(51) Int. Cl.

| | |
|---|---|
| *G06F 8/71* | (2018.01) |
| *G06F 9/445* | (2018.01) |
| *G06F 9/451* | (2018.01) |
| *G06F 15/177* | (2006.01) |
| *G06F 40/12* | (2020.01) |
| *H04L 9/00* | (2022.01) |
| *H04L 29/06* | (2006.01) |

(58) Field of Classification Search

CPC .... G06F 40/169; G06F 9/3017; G06F 40/117; G06F 40/12; G06Q 10/103; G06Q 20/3825; G06Q 50/188; G06Q 50/18; G06Q 10/10; H04L 9/32; H04L 63/12; H04L 9/3247; H04L 9/0643; H04L 9/3239

See application file for complete search history.

(56) References Cited

U.S. PATENT DOCUMENTS

| | | | | |
|---|---|---|---|---|
| 9,698,992 | B2 * | 7/2017 | Gertner | H04L 63/123 |
| 10,162,624 | B1 | 12/2018 | Moturu et al. | |
| 10,628,596 | B2 * | 4/2020 | Kumar | G06F 21/6209 |
| 10,642,925 | B2 * | 5/2020 | Gafford | G06V 30/1456 |
| 11,947,775 | B2 * | 4/2024 | Bar-on | G06Q 10/107 |
| 2008/0120294 | A1 | 5/2008 | Davis | |
| 2008/0195483 | A1 | 8/2008 | Moore | |
| 2009/0249321 | A1 | 10/2009 | Mandyam et al. | |
| 2012/0317007 | A1 | 12/2012 | Kino | |
| 2021/0286938 | A1 * | 9/2021 | Gazit | G06F 40/169 |
| 2022/0261139 | A1 | 8/2022 | Phoutchanthavongsa et al. | |
| 2023/0035194 | A1 | 2/2023 | Mukherjee et al. | |
| 2024/0231766 | A1 | 7/2024 | Ferreira et al. | |

OTHER PUBLICATIONS

Office Action from U.S. Appl. No. 18/345,799 dated Apr. 7, 2025, 20 pp.

Response to Office Action dated Apr. 7, 2025 from U.S. Appl. No. 18/345,799, filed Jul. 7, 2025, 12 pp.

Final Office Action from U.S. Appl. No. 18/345,799 dated Aug. 5, 2025, 30 pp.

Response to Final Office Action dated Aug. 5, 2025 from U.S. Appl. No. 18/345,799, filed Oct. 17, 2025, 10 pp.

Notice of Allowance from U.S. Appl. No. 18/345,799 dated Jan. 5, 2026, 10 pp.

* cited by examiner

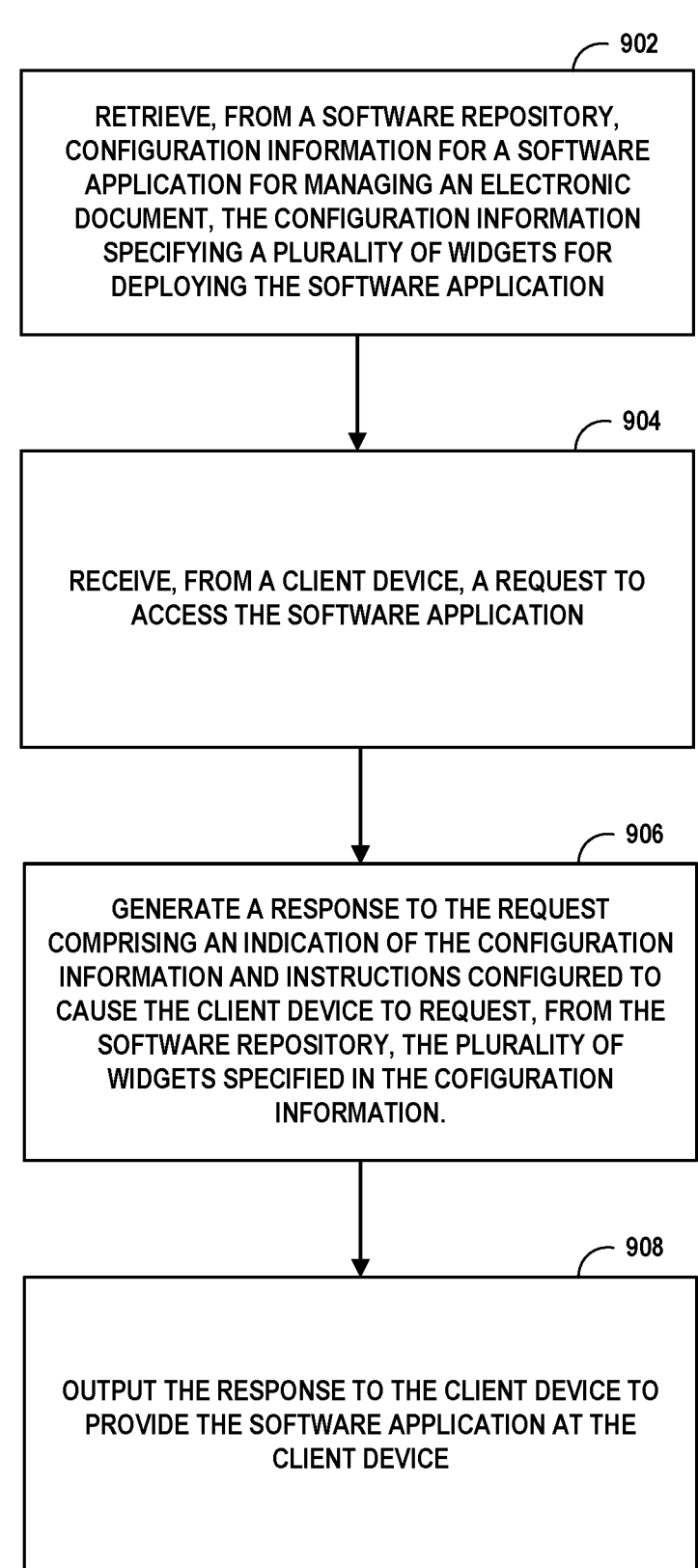

902

RETRIEVE, FROM A SOFTWARE REPOSITORY, CONFIGURATION INFORMATION FOR A SOFTWARE APPLICATION FOR MANAGING AN ELECTRONIC DOCUMENT, THE CONFIGURATION INFORMATION SPECIFYING A PLURALITY OF WIDGETS FOR DEPLOYING THE SOFTWARE APPLICATION

904

RECEIVE, FROM A CLIENT DEVICE, A REQUEST TO ACCESS THE SOFTWARE APPLICATION

906

GENERATE A RESPONSE TO THE REQUEST COMPRISING AN INDICATION OF THE CONFIGURATION INFORMATION AND INSTRUCTIONS CONFIGURED TO CAUSE THE CLIENT DEVICE TO REQUEST, FROM THE SOFTWARE REPOSITORY, THE PLURALITY OF WIDGETS SPECIFIED IN THE COFIGURATION INFORMATION.

908

OUTPUT THE RESPONSE TO THE CLIENT DEVICE TO PROVIDE THE SOFTWARE APPLICATION AT THE CLIENT DEVICE

FIG. 9

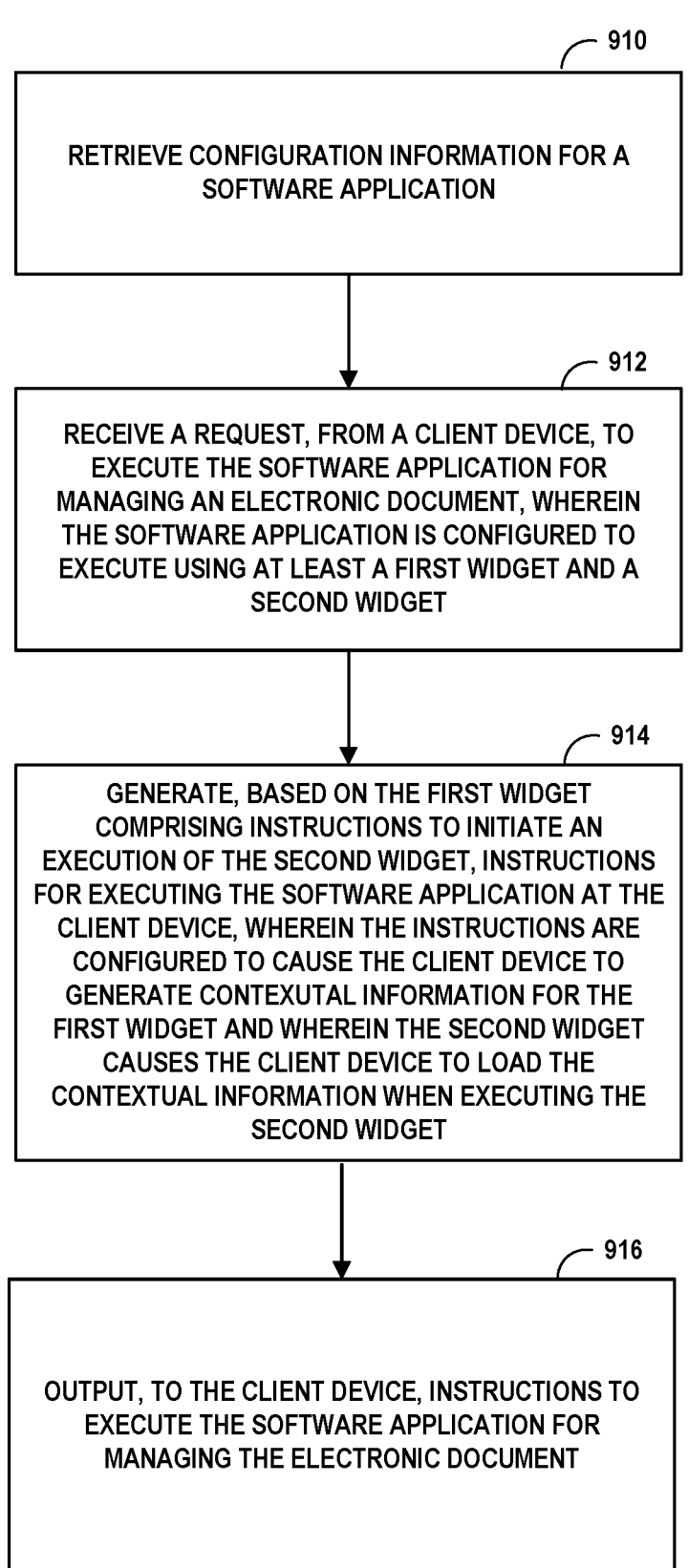

910

RETRIEVE CONFIGURATION INFORMATION FOR A
SOFTWARE APPLICATION

912

RECEIVE A REQUEST, FROM A CLIENT DEVICE, TO
EXECUTE THE SOFTWARE APPLICATION FOR
MANAGING AN ELECTRONIC DOCUMENT, WHEREIN
THE SOFTWARE APPLICATION IS CONFIGURED TO
EXECUTE USING AT LEAST A FIRST WIDGET AND A
SECOND WIDGET

914

GENERATE, BASED ON THE FIRST WIDGET
COMPRISING INSTRUCTIONS TO INITIATE AN
EXECUTION OF THE SECOND WIDGET, INSTRUCTIONS
FOR EXECUTING THE SOFTWARE APPLICATION AT THE
CLIENT DEVICE, WHEREIN THE INSTRUCTIONS ARE
CONFIGURED TO CAUSE THE CLIENT DEVICE TO
GENERATE CONTEXUTAL INFORMATION FOR THE
FIRST WIDGET AND WHEREIN THE SECOND WIDGET
CAUSES THE CLIENT DEVICE TO LOAD THE
CONTEXTUAL INFORMATION WHEN EXECUTING THE
SECOND WIDGET

916

OUTPUT, TO THE CLIENT DEVICE, INSTRUCTIONS TO
EXECUTE THE SOFTWARE APPLICATION FOR
MANAGING THE ELECTRONIC DOCUMENT

FIG. 10

SOFTWARE APPLICATION EXECUTION USING CONTEXTUAL INFORMATION

TECHNICAL FIELD

This disclosure relates generally to management of a software application.

BACKGROUND

Continuous integration and continuous deployment (CI/CD) environments implemented by software development teams typically include utilities for software developers to upload and deploy a software application. Current CI/CD environments generally involve software applications developed by various teams. Software development teams may develop and upload software application to CI/CD environments that are not compatible with each other. In addition, CI/CD environments generally require a server hosting the software application to restart every time a new version of the software application is deployed.

SUMMARY

Aspects of the present disclosure describe techniques for deploying a software application associated with document management. Software applications associated with document management may include user experiences related to managing electronic or digital documents (e.g., generate a document, sign a document, etc.). Software developers may create, update, integrate, deploy, or otherwise develop software applications via a continuous integration and continuous deployment ("CI/CD") environment. Software applications are deployed when the CI/CD environment allows client devices to request and access files and data included in the software applications. The techniques of the present disclosure, implements a common knowledge base that may help to ensure compatibility of all software components (e.g., widgets or plugins) used in software application development and deployment. In this way, the techniques facilitate software application development by allowing software developers to use previously developed software components, while potentially ensuring compatibility of the previously developed software components with software applications under development. For example, the techniques may allow a software developer to implement software components developed by software developers of a different software development team.

In one example, the present disclosure describes a system for deploying a software application associated with document management. The system may comprise processing circuitry implemented by one or more processors, the processing circuitry having access to a memory. The one or more processors may be configured to retrieve, from a software repository, configuration information for a software application for managing an electronic document, the configuration information specifying a plurality of widgets for deploying the software application. The one or more processors may also be configured to receive, from a client device, a request to access the software application. The one or more processors may also be configured to generate a response to the request comprising an indication of the configuration information and instructions configured to cause the client device to request, from the software repository, the plurality of widgets specified by the configuration information. The one or more processors may also be configured to output the response to the client device to provide the software application at the client device.

In another example, the present disclosure describes a method for deploying a software application associated with document management. The method may include retrieving, by processing circuitry implemented using one or more processors and from a software repository, configuration information for a software application for managing an electronic document, the configuration information specifying a plurality of widgets for deploying the software application. The method may further include receiving, by the processing circuitry and from a client device, a request to access the software application. The method may further include generating, by the processing circuitry, a response to the request comprising an indication of the configuration information and instructions configured to cause the client device to request, from the software repository, the plurality of widgets specified by the configuration information. The method may further include outputting, by the processing circuitry, the response to the client device to provide the software application at the client device.

In another example, the present disclosure describes a computer-readable storage medium comprising instructions that, when executed, configure processing circuitry of a computing system to retrieve, from a software repository, configuration information for a software application for managing an electronic document, the configuration information specifying a plurality of widgets for deploying the software application. The processing circuitry may further be configured to receive, from a client device, a request to access the software application. The processing circuitry may further be configured to generate a response to the request comprising an indication of the configuration information and instructions configured to cause the client device to request, from the software repository, the plurality of widgets specified by the configuration information. The processing circuitry may further be configured to output the response to the client device to provide the software application at the client device.

In one example, the present disclosure describes a system for deploying a software application associated with document management. The system may comprise processing circuitry implemented by one or more processors, the processing circuitry having access to a memory. The processing circuitry may be configured to receive a request, from a client device, to execute a software application for managing an electronic document, wherein the software application is configured to execute using at least a first widget and a second widget. The processing circuitry may also be configured to generate, based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget. The processing circuitry may also be configured to output, to the client device, the instructions to execute the software application for managing the electronic document.

In another example, the present disclosure describes a method for deploying a software application associated with document management. The method may include receiving a request, by processing circuitry implemented using one or more processors and from a client device, to execute a software application for managing an electronic document, wherein the software application is configured to execute using at least a first widget and a second widget. The method may further include generating, by the processing circuitry and based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget. The method may further include outputting, by the processing circuitry and to the client device, the instructions to execute the software application for managing the electronic document.

In another example, the present disclosure describes a computer-readable storage medium comprising instructions that, when executed, configure processing circuitry of a computing system to receive a request, from a client device, to execute a software application for managing an electronic document, wherein the software application is configured to execute using at least a first widget and a second widget. The processing circuitry may further be configured to generate, based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget. The processing circuitry may further be configured to output, to the client device, the instructions to execute the software application for managing the electronic document.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

FIG. 9 is a flow chart illustrating an example mode of operation for managing deployment of software applications, in accordance with the techniques of this disclosure.

FIG. 10 is a flow chart illustrating an example mode of operation for loading a software application according to contextual information.

Like reference characters denote like elements throughout the text and figures.

DETAILED DESCRIPTION

In general, aspects of the present disclosure describe techniques for deploying a software application associated with document management. Software applications associated with document management may include user experiences related to managing electronic or digital documents (e.g., generate an electronic document, sign an electronic document, etc.). Software applications may be deployed with multiple widgets. A widget may be a collection of software code used by the software application to provide the user experience (e.g., create a new Portable Document Format (PDF) file, open a PDF file, etc.). For example, a widget may be any snippet of JavaScript® logic that runs in a web browser. Software developers may create, update, integrate, deploy, or otherwise develop widgets for software applications via a continuous integration and continuous deployment ("CI/CD") environment. Current CI/CD environments may not guarantee widgets used for software application development will be compatible with each other because there is no common knowledge base. This may result in redundant code, duplication of effort, or human error involved in altering widgets to effectively interact with each other. The techniques of the present disclosure, implement a common knowledge base that may help to ensure compatibility of all widgets used in software application development and deployment. In this way, the techniques facilitate software application development by allowing software developers to use previously developed widgets, without having to worry about compatibility of the previously developed widgets with widgets under development. In some instances, the techniques may allow a software developer to implement widgets developed by software developers of a different software development team as a result of the ensured compatibility of all widgets managed by the common knowledge base.

In some systems, software developers may manually search through code repositories to open and/or implement various versions of widgets used for software applications. Software developers may currently use complex module federation techniques that are generally specific to individual software applications. The module federation techniques may require software developers to resolve compatibility issues for each software application that may incorporate a previously developed widget. Module federation techniques may result in additional work by software developers that is often redundant. For example, a software developer may have to redundantly resolve compatibility issues for the same widget being implemented in different software applications.

Figure 1:
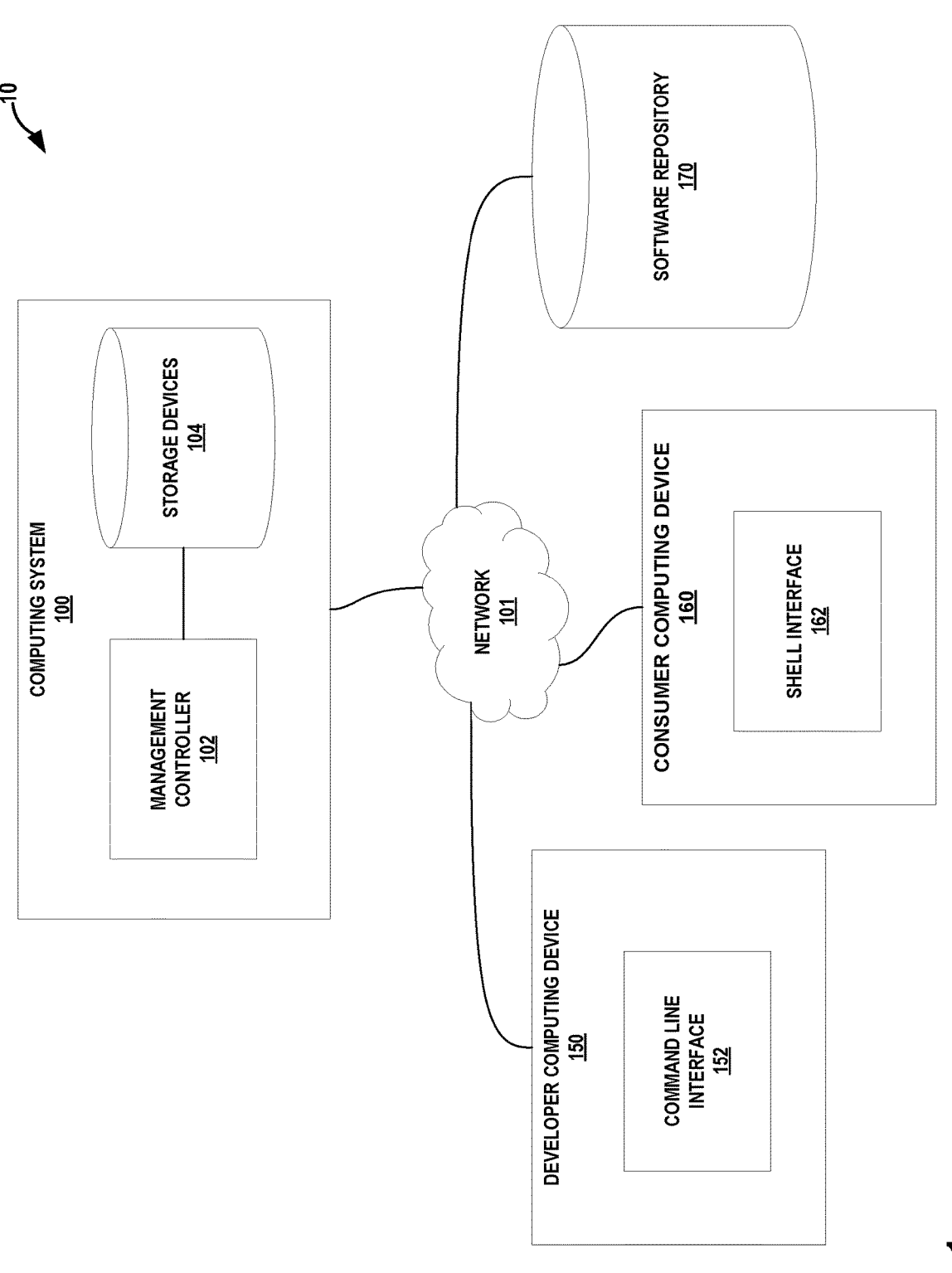
FIG. 1 is block diagrams illustrating an example computing environment for managing deployment of software applications, in accordance with techniques of the disclosure.

FIG. 1 is block diagrams illustrating an example computing environment 10, in accordance with techniques of the disclosure. In the example of FIG. 1, computing environment 10 includes computing system 100, developer computing device 150, consumer computing device 160, and software repository 170. Computing environment 10 may represent a CI/CD environment for developers to write and release software applications. Computing environment 10 may include a starter kit, utilities, standard development kits, application programming interfaces, or other developer resources. Computing system 100 may manage the developer resources to help developers upload code to a repository that is compatible with other code in the repository. In some examples, computing system 100 may represent a cloud computing system that provides one or more services via network 101. Computing system 100 may include a collection of hardware devices, software components, and/or data stores that can be used to implement one or more applications or services provided to developer computing device 150 and consumer computing device 160 via network 101. As used herein, client device may refer to developer computing device 150, consumer computing device 160, or a device that performs the function of both developer computing device 150 and consumer computing device 160.

Network 101 may include the Internet or may include or represent any public or private communications network or other network. For instance, networks 101 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 101 using any suitable communication techniques. Network 101 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 101 using one or more network links. The links coupling such devices or systems to network 101 may be Ethernet, Asynchronous Transfer Mode (ATM) or other types of network connections, and such connections may be wireless and/or wired connections. One or more of the devices or systems illustrated in FIG. 1 or otherwise on network 101 may be in a remote location relative to one or more other illustrated devices or systems.

Computing system 100, developer computing device 150, consumer computing device 160, and software repository 170 may send and receive data via network 101. Data exchanged over the network 101 may be represented using any suitable format, such as hypertext markup language (HTML), extensible markup language (XML), or JavaScript Object Notation (JSON). In some aspects, network 101 may include encryption capabilities to ensure the security of documents. For example, encryption technologies may include secure sockets layers (SSL), transport layer security (TLS), virtual private networks (VPNs), and Internet Protocol security (IPsec), among others.

Examples of developer computing device 150 and consumer computing device 160 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. Developer computing device 150 and consumer computing device 160 may be examples of client devices that may interact with computing system 100 to upload, use, or otherwise access software applications managed by computing system 100.

Developer computing device 150 may include command line interface 152. Developer computing device 150 may be operated by a software developer who may upload and access code for a software application based on configuration information received from computing system 100. Command line interface 152 may provide an interactive environment for developers to develop and deploy software applications. Command line interface 152 may include, but is not limited to, a shell terminal or application programming interface managed by computing system 100.

Developer computing device 150 may use command line interface 152 to upload software code to software repository 170. In some instances, developer computing device 150 may pull software applications and resources associated with the software applications from software repository 170. Software repository 170 may include, but is not limited to, a content delivery network, cloud storage systems, or any collection of databases used to store and send software files. For example, software repository 170 may be a content delivery network that implements Microsoft Solutions Framework®.

Consumer computing device 160 may include shell interface 162. Consumer computing device 160 may be a computing device operated by a consumer of software applications managed by computing system 100. Shell interface 162 may include, but is not limited to, a web browser or user interface that may request data from computing system 100 and software repository 170 via network 101. Consumer computing device 160 may request access to a software application with shell interface 162 (e.g., a browser shell interface). Consumer computing device 160 may request the software application to manage electronic documents. Currently, CI/CD environments may require a server hosting the software application to restart when deploying a new version of the software application. This may result in interruptions of a user's experience using the software application. The techniques described herein apply a common knowledge base (e.g., computing system 100) to regulate network traffic to new versions of software applications. In this way, the techniques avoid necessarily restarting a host of a software application when a new version of the software application is deployed to improve host availability, thereby potentially improving a user's experience using the software applications. The techniques described herein may help to improve a user's experience when consuming a software application by reducing or eliminating a number of interruptions that result from deploying a new version of a software application.

In the example of FIG. 1, computing system 100 may be one or more servers locally managed by a software administrator or a distributed or cloud-based computing system managed by the software administrator. Computing system 100 may include an environment of computing devices interoperable coupled to perform the techniques described herein. Computing system 100 may include management controller 102 and storage devices 104. Management controller 102 may be a module with instructions to manage new and updated software applications. For example, management controller 102 may be configured to upload and/or update configuration files associated with widgets used to deploy a software application. Management controller 102 may store new and/or updated configuration files associated with widgets in storage devices 104. Storage devices 104 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support computing system 100. Functionality of management controller 102 and storage devices 104, as described herein, may be distributed across multiple computing devices within the distributed or cloud-based environment of computing system 100.

In accordance with the techniques of the disclosure, software developers may avoid redundancy of effort creating a widget that has already been previously created. For example, a computing system 100 may implement a common knowledge base platform that may maintain common core components and utilities and the implementations thereof. Computing system 100 may be configured to allow software developers to upload widgets in a standardized format (e.g., a build artifact) to ensure that all widgets managed by the system may be used in multiple software applications without additional effort from the software developers. Computing system 100 includes a common knowledge base platform offering a contextual, layered abstraction for use by software development teams that allow software developers to improve efficiency, quality assurance, and security of software application integration and deployment.

In operation, computing system 100 facilitates software application development by helping to ensure compatibility of all software application components (e.g., plugins and utility widgets) managed by computing system 100. For example, developer computing device 150 may allow a software developer to develop code for a widget used in a software application. Computing system 100 may provide software-based resources to developer computing device 150 through any well-known standard development kits (SDKs), application programming interfaces (APIs), a combination of the two, or other interfaces for developing software. For example, computing system 100 may provide a set of SDKs and APIs that may be used by command line interface 152 to develop and upload software code files to software repository 170 via network 101.

Computing system 100 may manage a utility to help to ensure all software code uploaded to software repository 170 is compatible. For example, computing system 100 may send instructions to command line interface 152 to convert developed software applications to a standardized format. Command line interface 152 may use the received instructions to generate a build artifact of the developed software code. Command line interface 152 may generate a build artifact by wrapping the developed software code in a standardized format. Command line interface 152 may send the build artifact to software repository 170 to ensure all software code stored in software repository 170 is compatible.

Computing system 100 may provide utilities to help to ensure compatibility of code developed and uploaded by developer computing device 150 may help to ensure the execution of software applications remains largely undisturbed. For example, computing system 100 may store software utilities (e.g., SDKs, APIS, etc.) that are developed by a software administrator. Computing system 100 may send the software utilities that include instructions for developer computing device 150 to upload build artifacts of developed widgets according to a standardized format. Developer computing device 150 may receive the software utilities and execute the instructions included in the software utilities.

Computing system 100 instructing developer computing device 150 with software utilities may avoid disruptions associated with changes or updates to code used by various teams of software developers. Computing system 100 may provide instructions to developer computing device 150 to bundle multiple assets that help to ensure compatibility with an existing software application. For example, computing system 100 may instruct developer computing device 150 to wrap all widgets and data used in a software application into a standardized format. Computing system 100 may provide instructions to developer computing device 150 to bundle multiple assets that ensure compliance with other software application components developed in computing environment 10. In this way, computing system 100 may help to reduce computational resources required when software developers integrate code developed by developers from other teams developing code in computing environment 10.

Computing system 100 may provide pre-deployment utilities that help software developers operating developer computing device 150 to verify widget compatibility with the larger common knowledge base ecosystem. Computing system 100 may also provide pre-deployment utilities that help software developers operating developer computing device 150 to verify quality assurance and/or security compliance with pre-deployment tests. Developer computing device 150 may use pre-development utilities to execute pre-deployment tests that may verify a software application may be deployed with no identifiable software bugs that hinder a user's experience with the software application or expose the software application to malicious actors.

Developer computing device 150 may use the pre-development utilities to verify quality assurance according to guidelines created by a software administrator or software development teams. For example, computing system 100 may provide a pre-deployment utility that instructs command line interface 152 of developer computing device 150 to preview runtime deployment behavior of software applications. Developer computing device 150 may preview runtime deployment behavior of software applications by executing software applications based on pre-deployment configuration files. For example, developer computing device 150 may preview runtime deployment behavior of a software application by executing one or more recently uploaded versions of widgets used in the software application. Developer computing device 150 may preview runtime deployment behavior such as load times, physical appearance of a graphical user interface, or other runtime processes associated with software applications. Computing system 100 may provide a utility to developer computing device 150 with instructions for developer computing device 150 to output reports of service level or performance-related metrics. Developer computing device 150 may use the pre-deployment utility to add, comment, or change software application code files based on the metrics. Developer computing device 150 may alter software application code files to satisfy the quality assurance guidelines. Developer computing device 150 may use the pre-development utilities to identify and prevent software application security vulnerabilities. For example, computing system 100 may provide a pre-deployment utility with software application security testing tools such as static application security testing (SAST), dynamic application security testing (DAST), software composition analysis (SCA), database security scanning, etc. Developer computing device 150 may use the pre-development utilities to ensure compliance with any necessary security requirements (e.g. security guidelines established by a software administrator, Service Organization Control Type 2 (SOC 2) framework, etc.).

In some instances, management controller 102 of computing system 100 may generate a configuration file for each widget used to deploy software application. Computing system 100 may generate a configuration file for a software application that may include data identifying one or more widgets used for the software application. Computing device 100 may also include references to a particular version of widgets included in the software application, as well as references indicating dependencies of one or more widgets used in the software application.

Management controller 102 may generate different types of configuration files based on the type of widget used to deploy a software application. For example, management controller 102 may generate a different type of configuration file for a plugin, compared to other types of widgets (e.g., utility or experience-based widgets). A plugin may be a type of widget that includes data for a graphical user interface that outputs data associated with the one or more utility widgets underlying a software application. In some examples, a plugin may be a type of widget corresponding to a reference (e.g., uniform resource locator or URL) for a software application. A utility widget may be a type of widget that support functionality of a software application without including a frontend user interface. Utility widgets may be shared by different software applications due to the ensured compatibility according to the techniques described herein. Plugins and utility widgets may be assigned to a domain (e.g., a web domain such as domain.net) that is managed by software repository 170. References to a software application, or widgets of the software application, may be uniform resource indicators (URIs) that append the domain managed by software repository 170. For example, a software application may be assigned a domain of domain-.net. The software application may include a widget that includes a reference to append the domain assigned to the software application, such as a reference of "/widget" that appends the domain to be "domain.net/widget."

As discussed in further detail below with respect to FIG. 5, management controller 102 may generate a configuration file for a plugin that may include configuration information associated with a domain (e.g., website domain) and/or path reservation (e.g., uniform resource indicator) for a software application. Management controller 102 may generate a configuration file that may be a structured representation of the configuration information. Management controller 102 may generate a configuration file for a plugin that specifies authentication provisions for accessing widgets and data included in the software application. Management controller 102 may generate a configuration file for a plugin that identifies utility widgets the software application includes and corresponding references (e.g., uniform resource indicator) that may be used by consumer computing device 160 to request access to the utility widget from software repository 170. Management controller 102 may generate a configuration file for a utility widget that may include configuration information associated with an identification assigned to the utility widget. Management controller 102 may generate a configuration file for a utility widget that specifies a version of the utility widget. In some examples, management controller 102 may generate a configuration file for a utility widget that identifies one or more references to versions of other widgets the utility widget depends on and/or a reference (e.g., uniform resource indicator) associated with the utility widget.

Management controller 102 may update configuration information included in one or more configuration files associated with the uploaded software files. For example, command line interface 152 may upload a new version of a widget to software repository 170 via network 101. Computing system 100 may detect a new version of the widget has been uploaded to software repository 170. In some examples, computing system 100 may generate a pre-deployment configuration file for the updated version of the widget. Computing system 100 may send the pre-deployment configuration file to other computing devices to run pre-deployment testing (e.g., quality assurance and/or security tests). Computing system 100 may only update the configuration file for the widget responsive to the new version of the widget satisfying thresholds associated with a CI/CD testing procedure. Computing system 100 may update a configuration file by updating a version number of the widget associated with the configuration file. Computing system 100 may update a reference to the location of the widget to be a reference to the location of where the new version of the widget is stored in software repository 170.

Management controller 102 may only update deployment configuration files referencing widgets with an adequate health score. The techniques described herein may improve security of software application deployment by reducing possibilities of "zero-day attacks" on vulnerabilities associated with newly deployed code. By regulating network traffic of newly deployed software applications with a common knowledge base, computing system 100 may allow developers to identify vulnerabilities of a new version of a software application prior to directing all network traffic to the new version of the software application.

Figure 2:
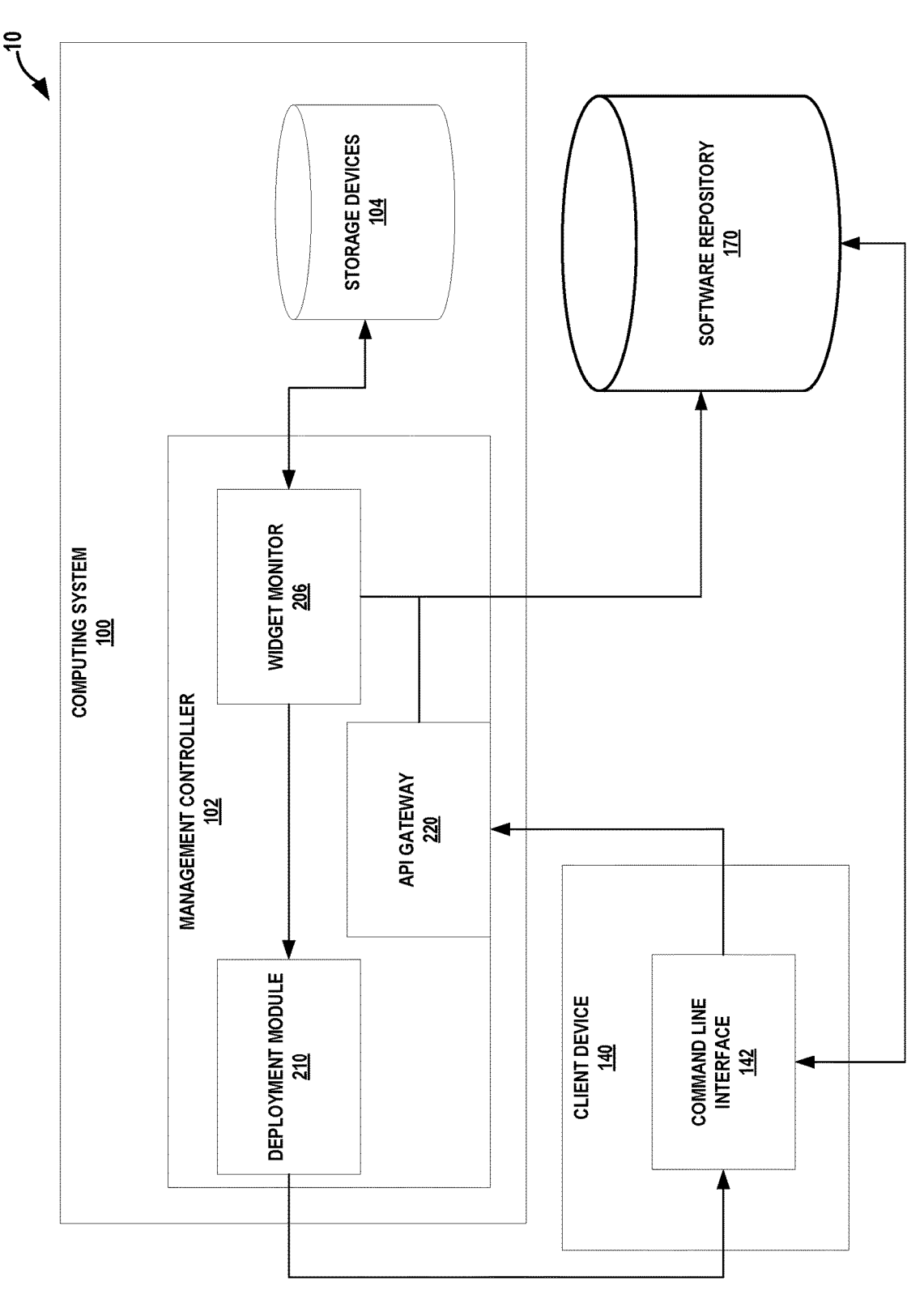
FIG. 2 is a block diagram illustrating an example computing environment with example details of a computing system, in accordance with the techniques of this disclosure.

FIG. 2 is a block diagram illustrating example computing environment 10 for managing software applications, in accordance with the techniques of this disclosure. In the example of FIG. 2, computing environment 10 may include computing system 100, client device 140, and software repository 170. Computing system 100, client device 140, and software repository 170 may be communicably coupled via network 101 of FIG. 1, for example. Client device 140 may correspond to either developer computing device 150 or consumer computing device 160 of FIG. 1. In some examples, client device 140 may perform the function of both developer computing device 150 or consumer computing device 160 of FIG. 1. Client device 140 may include command line interface 142. Command line interface 142 may correspond to either command line interface 152 or shell interface 162 of FIG. 1.

Management controller 102 may include deployment module 210, widget monitor 206, and Application Programming Interface (API) Gateway 220. In some example, widget monitor 206 of management controller 102 may periodically (e.g., user-defined dates and/or times) and/or continuously (e.g., every 10 seconds) monitor widgets stored in software repository 170. For example, widget monitor 206 may monitor a version of an existing widget. In some examples, widget monitor 206 may monitor for new and/or removed widgets. Widget monitor 206 may use API Gateway 220 to monitor and retrieve configuration information associated with widgets managed by software repository 170. Widget monitor 206 may use API Gateway 220 to monitor changes to configuration information or new configuration information associated with widget uploaded to software repository 170. API Gateway 220 may be an API management tool that interfaces between client device 140 and software repository 170. API Gateway 220 may act as a server that forwards requests to access software applications (e.g., a reverse proxy) to accept all API calls made by client device 140. API Gateway 220 may aggregate various services required to fulfill API calls made by client device 140. Computing system 100 may use API Gateway 220 to send appropriate results to API calls made by client device 140. For example, API Gateway 220 may send configuration files-including configuration information-associated with widgets requested by client device 140. This allows management controller 102 to continuously update configuration files associated with updated widgets (e.g., updated version).

In operation, computing system 100 may retrieve configuration information for a software application. In some examples, management controller 102, and more specifically widget monitor 206, may retrieve configuration information that may specify a plurality of widgets used to deploy the software application. Widget monitor 206 may use API Gateway 220 to poll software repository 170 for new widgets or new versions of widgets. Widget monitor 206 may poll software repository 170 every ten seconds.

Widget monitor 206 may detect whether a new widget or a new version of a widget has been uploaded to software repository 170. Widget monitor 206 may use API Gateway 220 to retrieve configuration information associated with an uploaded widget. In some instances, widget monitor 206 may only retrieve configuration information of widgets that have been uploaded in a standardized format (e.g., build artifact).

Widget monitor 206 may generate a configuration file based on the configuration information retrieved from software repository 170. Widget monitory 206 may generate a configuration file that is a structured representation of the configuration information. In some instances, widget monitor 206 may generate a pre-deployment configuration file. Widget monitor 206 may generate a pre-deployment configuration file to allow developers to execute quality assurance and security tests on newly uploaded widgets. In some examples, widget monitor 206 may generate a deployment-ready configuration file for an uploaded widget responsive to the uploaded widget satisfying quality assurance and security tests. Widget monitor 206 may store configuration files in storage devices 104.

Management controller 102, and more specifically deployment module 210, may receive a request from client device 140 to access a software application. Client device 140 may request access to the software application with command line interface 142, for example. Client device 140 may be operated by a software developer. The software developer operating computing device 140 may, for example, request access to a software application to implement the software application in another software application under development. In another example, the software developer operating client device 140 may request access to a software application to perform development tests on a new version of the software application (e.g., build validation testing). In this example, client device 140 may specifically request pre-deployment configuration information associated with the new version of the software application.

Deployment module 210 may generate a response to a request from client device 140 to access the software application. Deployment module 210 may generate a response that includes an indication of the configuration information associated with the requested software application. Deployment module 210 may also generate the response to specify multiple widgets used to deploy the requested software application. For example, deployment module 210 may generate a response that includes configuration files associated with a plugin and one or more utility widgets used to deploy the requested software application.

In some examples, deployment module 210 may request updated configuration files from widget monitor 206. Widget monitor 206 may check whether a configuration file associated with a requested widget is updated based on indications of the type of configuration file. In response to widget monitor 206 determining the configuration file for a requested widget is up-to-date, widget monitor 206 may pull the configuration file associated with the requested widget from storage devices 104. Widget monitor 206 may send the configuration file to deployment module 210.

Deployment module 210 may output the generated response to client device 140. Deployment module 210 may output the response to provide the software application at client device 140. For example, deployment module 210 may send a signal to client device 140, via network 101 of FIG. 1, for example. Deployment module 210 may include configuration files associated with a plugin and one or more utility widgets used to deploy the requested software application. Client device 140, and more specifically command line interface 142, may receive the signal with configuration files associated with the requested software application. Command line interface 142 may request widgets and data indicated in the configuration files from software repository 170. Command line interface 142 may load relevant widgets and data used to deploy the requested software application based on contextual information. Command line interface 142 may generate contextual information based on configuration files associated with widgets used to deploy the requested software application, as discussed in more detail below with respect to FIG. 6.

Deployment module 210 may send command line interface 142 to generate contextual information associated with configuration information for a requested software application. For example, command line interface 142 may request to execute a software application from computing system 100. Command line interface 142 may request a software application that is configured to execute using multiple widgets. Command line interface 142 may send a signal to API Gateway 220 requesting the software application. API Gateway 220 may relay the request to widget monitor 206. Widget monitor 206 may determine the appropriate configuration files associated with the requested software application. Widget monitor 206 may pull the appropriate configuration files from storage devices 104. Widget monitor 206 may relay the appropriate configuration files to deployment module 210. Deployment module 210 may send the appropriate configuration files associated with the requested software application to command line interface 142. Deployment module 210 may also generate instructions for executing the software application at command line interface 142.

Computing system 100, and more specifically deployment module 210, may generate instructions for executing a software application at client device 140. Deployment module 210 may generate instructions that are configured to cause client device 140 to generate contextual information. For example, deployment module 210 may generate instructions that are configured to cause command line interface 142 of client device 140 to generate contextual information specifying widgets and data necessary to execute the requested software application. Client device 140 may generate contextual information indicating references to versions of widgets used to execute the requested software application. Client device 140 may also generate contextual information indicating dependencies and data specified in the requested software application. For example, client device 140 may generate contextual information with multiple properties specifying whether widget configuration information associated with the received configuration files should be classified as configuration information for a platform widget, a host widget, or a child widget.

Command line interface 142 may load widgets and data associated with the requested software application based on the generated contextual information. Command line interface 142 may send a signal to software repository 170 requesting the widgets and data associated with the configuration information included in a received configuration file. Software repository 170 may send the widgets and data associated with the requested software application to client device 140. Software repository 170 may send all the widgets and data used to execute with the requested software application defined by the configuration file sent by computing system 100. Client device 140 may display the software application with command line interface 142 based on the widgets and data received from software repository 170. Deployment module 210 may output instructions to command line interface 142 to execute the requested software application. For example, deployment module 210 may output instructions that cause command line interface 142 to load the received widgets and data in parallel rather than sequentially.

The techniques may provide one or more technical advantages that realize at least one practical application. Computing system 100 may provide a common knowledge base that facilitates the development, deployment, and execution of software applications throughout the CI/CD pipeline. For example, computing system 100 may store configuration files associated with multiple widgets to prevent redundancy of widgets used in multiple software applications. In this way, computing system 100 may update configuration files for widgets without having to restart a server hosting traffic for the widget. By receiving, storing, and sending configuration information for widgets used to execute a software application, rather than simply sending references to the widgets used to execute the software application, computing system 100 may intelligently regulate which version of widgets are executed by client device 140.

In addition, computing system 100 may instruct client device 140 to execute multiple widgets of the software application in parallel, which may result in an improved user experience using the software application. Computing system 100 may improve a user's experience navigating to various widgets used to execute the software application by instructing client device 140 to use spare network bandwidth to load all widgets for the software application, even before some of the widgets are needed. Computing system 100 instructing client device 140 to generate contextual information used to execute the software application, results in client device 140 loading all the widgets and data associated with a software application at one time. Client device 140 may allow a user to instantaneously access processes and data of all widgets and data used to execute the software application because client device 140 has received, and made available, all the widgets and data associated with the software application.

The techniques may improve a user's experience consuming software applications with seamless page navigation by loading all the required widgets and data for a software application in parallel. Currently, widgets and data that support software applications are loaded sequentially which may result in interruptions of a user's experience. The techniques described herein may provide a utility to generate contextual information that may be generated and used to load all the required widgets and data for a software application at runtime. In this way, computing system 100 may reduce the time client device 140 takes to load a requested software application. The techniques may also avoid any potential bugs or errors that result from deploying a new version of a widget because the contextual information may only include configuration information associated with versions of widgets that have satisfied quality assurance and security requirements.

Figure 3:
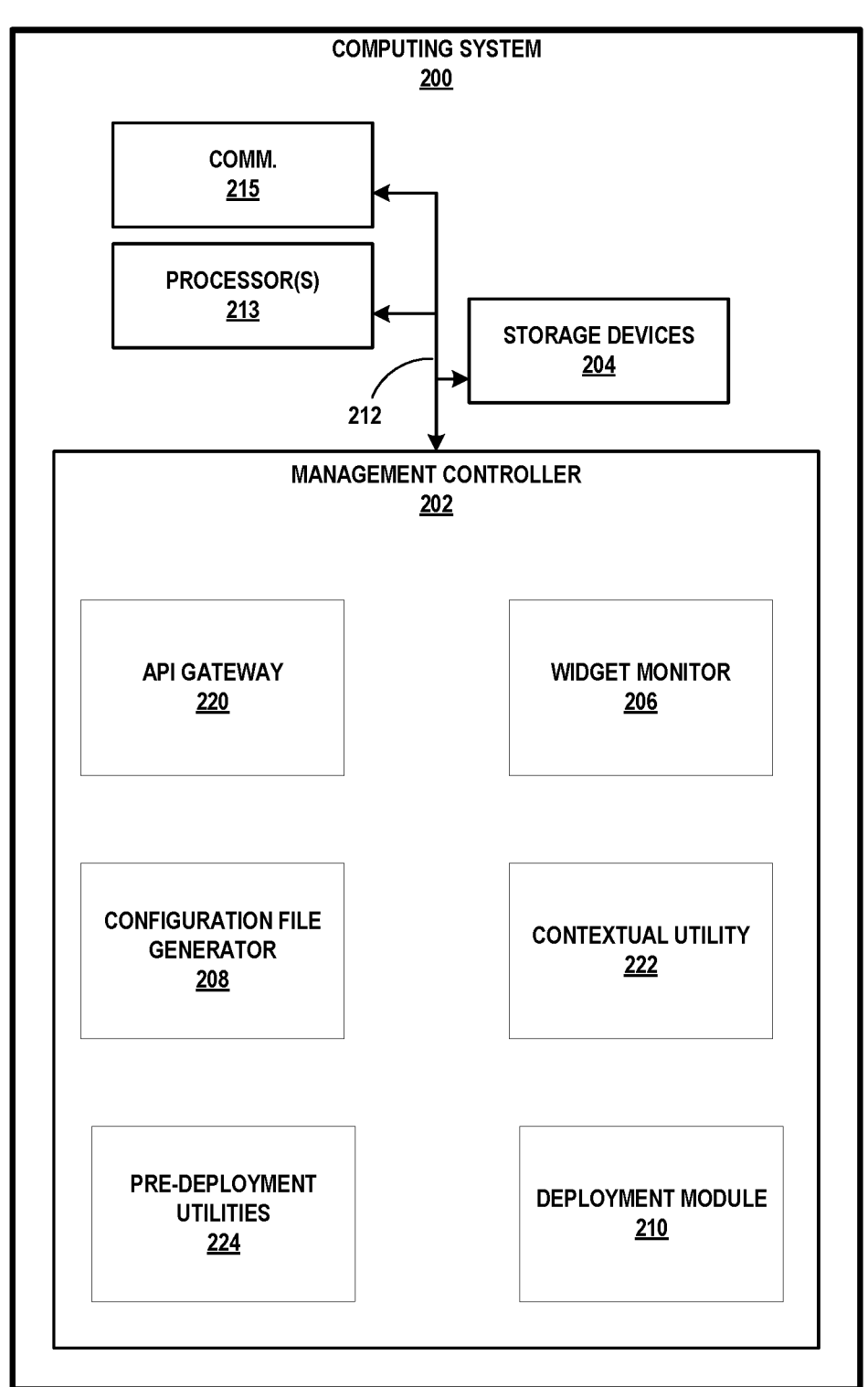
FIG. 3 is a block diagram illustrating an example computing system for managing versions of software applications and deployment thereof, in accordance with the techniques of this disclosure.

FIG. 3 is a block diagram illustrating example computing system 200 for managing software applications, in accordance with the techniques of this disclosure. Computing system 200 of FIG. 3 may be described as an example or alternate implementation of computing system 100 of FIGS. 1 and 2. One or more aspects of FIG. 3 may be described herein within the context of FIGS. 1 and 2 for example purposes only.

Computing system 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 200 represents a cloud computing system, server farm, and/or server cluster (or portion thereof) that provides services to other devices or systems. Computing system 200 may represent or be implemented through one or more virtualized computer instances (e.g., virtual machines, containers) of a cloud computing system, server farm, data center, and/or server cluster.

In the example of FIG. 3, computing system 200 may include one or more communication units 215, one or more input devices 217, one or more output devices 219, storage devices 204, and management controller 202. One or more of the devices, modules, storage areas, or other components of computing system 200 may be interconnected to allow for inter-component communications (e.g., physically, communicatively, and/or operatively). In some examples, such connectivity may be provided by communication channels (e.g., communication channels 212), which may represent one or more of a system bus, a network connection, an inter-process communication data structure, or any other method for communicating data.

One or more processors 213 of computing system 200 may implement functionality and/or execute instructions associated with computing system 200 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 200 may use one or more processors 213 to perform operations in accordance with one or more aspects of the present disclosure using software, hardware, firmware, or a mixture of hardware, software, and firmware residing in and/or executing at computing system 200.

One or more communication units 215 of computing system 200 may communicate with devices external to computing system 200 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

Storage devices 204 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support the computing system 200. Storage devices 204 may be distributed across multiple devices or servers within the a cloud computing environment provided by computing system 200.

One or more processors 213 may provide an operating environment or platform for various modules described herein, which may be implemented as software, but may in some examples include any combination of hardware, firmware, and software. One or more processors 213 may execute instructions of one or more modules. Processors 213 may retrieve, store, and/or execute the instructions and/or data of one or more applications, modules, or software. Processors 213 may also be operably coupled to one or more other software and/or hardware components, including, but not limited to, one or more of the components of computing system 200 and/or one or more devices or systems illustrated as being connected to computing system 200.

Management controller 202 may include API Gateway 220, widget monitor 206, configuration file generator 208, contextual utility 222, pre-deployment utilities 224, and deployment module 210. API Gateway 220 may be an API management tool that interfaces between client device 140 and software repository 170 of FIG. 2. API Gateway 220 may act as an external server that forwards requests to access a software application (e.g., reverse proxy) to accept all API calls made by client devices. In this way, API Gateway 220 may allow computing system 200 to manage software applications by acting as an interface for client devices to request the appropriate components of a software application from a software repository or content delivery network.

Computing system 200 may maintain configuration files that include configuration information for various versions of widgets. Computing system 200 may intelligently regulate which version of widgets are sent to particular requests by sending appropriate configuration files associated with configuration information for particular versions of widgets.

In accordance with the techniques described herein, widget monitor 206 may retrieve configuration information for a software application. Widget monitor 206 may receive configuration information specifying multiple widgets for deploying the software application. Widget monitor 206 may retrieve the configuration information via API Gateway 220.

In some instances, widget monitor 206 may send instructions to configuration file generator 208 to generate one or more configuration files based on the retrieved configuration information. Widget monitor 206 may send the instructions to configuration file generator 208 to generate configuration files responsive to widget monitor 206 detecting a new version of a widget used to execute the software application has been uploaded. Configuration file generator 208 may generate a configuration file that includes the retrieved configuration information.

In some examples, widget monitor 206 may send instructions to configuration file generator 206 to generate a pre-deployment configuration file. Configuration file generator 206 may generate a pre-deployment configuration file based on a newly uploaded widget that has not been tested for quality assurance and security compliance. Pre-deployment utilities 224 may manage pre-deployment configuration files. Pre-deployment utilities 224 may also provide software utilities (SDKs, APIs, etc.) to software administrators to run quality assurance and security tests on a newly uploaded widget. For example, pre-deployment utilities 224 may provide tools for software administrators to assign a health score to a newly uploaded widget.

API Gateway 220 of management controller 202 may receive a request to execute a software application. In some instances, API Gateway 220 may obtain a request to execute a software application for managing an electronic document. Deployment module 210 may prepare a response to the request to execute the software application. Deployment module 210 may compile necessary configuration files for widgets used to execute the requested software application from storage devices 204.

In some instances, deployment module 210 may include instructions generated by contextual utility 222 in a response to a request for a software application. Contextual utility 222 may generate instructions for loading widgets and data used to execute a software application.

Figure 4A:
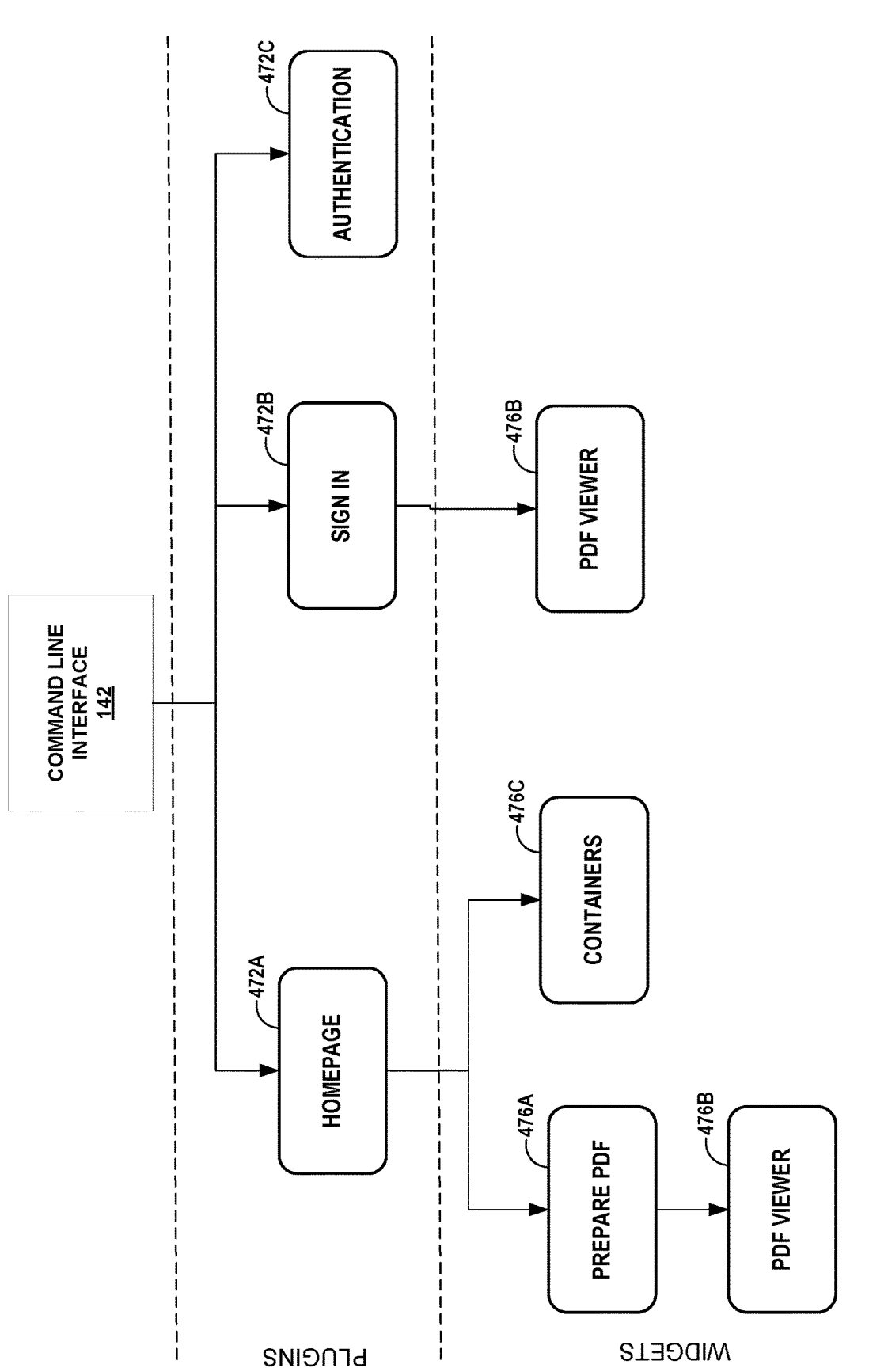
FIGS. 4A and 4B are a block diagrams illustrating an example computing device loading software applications, in accordance with the techniques of this disclosure.

FIG. 4A is block diagrams illustrating an example computing device loading software applications, in accordance with the techniques of this disclosure. Command line interface 142 of FIG. 4A may correspond to command line interface 142 of FIG. 2. Command line interface 142 may load different software applications that include user experiences for managing electronic documents. For example, Command line interface 142 may load a software application associated with a user creating a profile for a document management platform. Command line interface 142 may load a software application associated with authenticating credentials to use a document management platform. Command line interface 142 may load a software application associated with a homepage of a document management platform.

Command line interface 142 may load a software application associated with viewing a PDF version of an electronic document. Command line interface 142 may load a software application associated with a shared electronic document workspace or "room." The techniques described herein provide a common knowledge base (e.g., computing system 100 of FIGS. 1 and 2) that allows different software applications to include widget 476B. The common knowledge base, provided by computing system 100 of FIG. 1 for example, may reduce duplication of effort and improve efficiency of software application development by ensuring that all widgets developed in computing environment 10 are compatible.

In the example of FIG. 4A, command line interface 142 may load a software application that includes plugin 472A, widget 476A, widget 476B, and widget 476C. Command line interface 142 may alternatively load a software application that includes plugin 472B and widget 476B. Command line interface may load a software application that includes only plugin 472C. Command line interface 142 may load widgets according to contextual information. Command line interface 142 may load widgets according to contextual information specifying a dependency tree of widgets used to execute a requested software application.

Plugins 472A-C (collectively referred to herein as plugins 472) may be a type of widget that includes data for a user interface that outputs data associated with the one or more utility widgets underlying a software application. In some examples, plugins 472 may be a type of widget corresponding to a reference (e.g., uniform resource indicator) for a software application. Plugins 472 may each correspond to an individual software application. Plugins 472 may be associated with configuration information specifying details around a domain and/or path reservation, authentication provisions, utility widgets underlying the software application, and any uniform resource indicators associated with the utility widgets. For example, command line interface 142 may load plugin 472C to output a graphical user interface allowing a user to input credentials to access a document management platform.

Widgets 476A-476C (collectively referred to herein as widgets 476) may be utility widgets that define underlying processes of a software application. Widgets 476 may each be a type of widget that support functionality of a software application without including a frontend user interface. Widgets 476 may be developed locally on a developer computing device. Widgets 476 may be uploaded to a software repository managed by computing system 100 of FIGS. 1 and 2, for example. Widgets 476 may be uploaded, for example, as a build artifact that wraps software code into a standardized format.

Command line interface 142 may load a software application for a homepage of an electronic document management platform. Command line interface 142 may load plugin 472A based on contextual information received from computing system 100 of FIGS. 1 and 2, for example. Plugin 472A may be a graphical user interface that outputs data for a home page associated with an electronic document management platform. Plugin 472A may be loaded with widgets 476A, 476B, and 476C based on the contextual information received from computing system 100. Widget 476C may correspond to a utility widget that includes software code to open a container of related electronic documents. Widget 476A may correspond to a utility widget that includes software code to prepare an electronic document (e.g., "prepare PDF"). Widget 476A may depend on functionality of widget 476B, resulting in widget 476B being a dependency widget. Widget 476B may correspond to a utility widget to that includes software code to view an electronic document (e.g., "PDF viewer").

Command line interface 142 may load a software application to sign in and view an electronic document. Command line interface 142 may load plugin 472B based on contextual information received from computing system 100 of FIGS. 1 and 2, for example. Plugin 472B may be a graphical user interface that outputs data for a user operating command line interface 142 to sign in to view an electronic document. Plugin 472B may be loaded with widget 476B based on the contextual information received from computing system 100. Widget 476B may correspond to a utility widget to that includes software code to view the electronic document (e.g., "PDF viewer").

Widgets 476 may be shared by different software applications due to the ensured compatibility according to the techniques described herein. For example, command line interface 142 may load different software applications that use functionality of widget 476B (e.g., processes defining a user experience for viewing an electronic document). Any of widgets 476 may be referenced in plugins associated with various software applications managed by computing system 100 of FIGS. 1 and 2. In this way, widgets 476 may be shared by software developers of various teams, thereby improving the efficiency of software application development, and reducing duplication of effort.

Figure 4B:
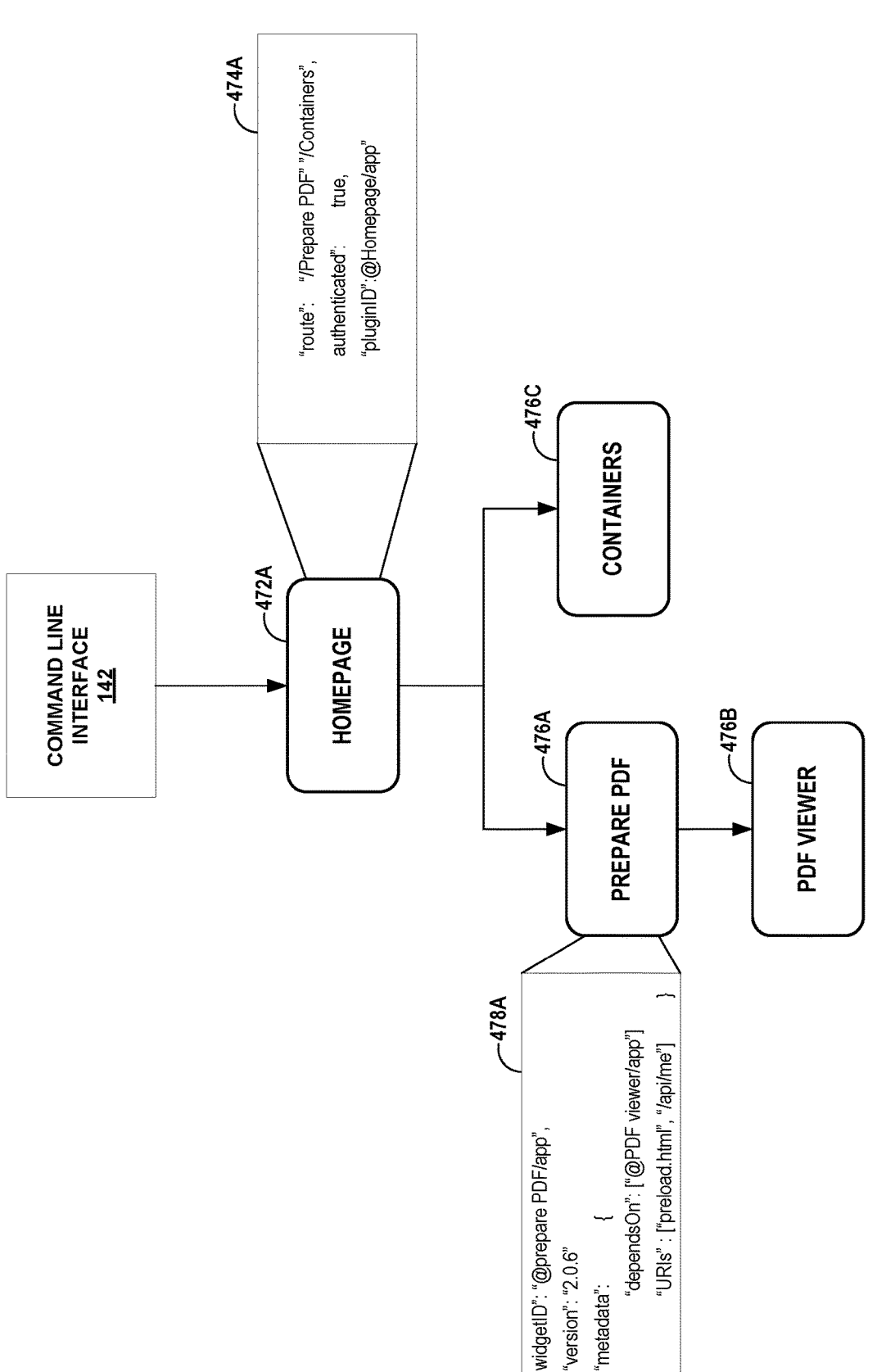

FIG. 4B is block diagrams illustrating an example computing device loading software applications, in accordance with the techniques of this disclosure. Command line interface 142 of FIG. 4A may correspond to command line interface 142 of FIG. 2.

In the example of FIG. 4B, command line interface 142 may request plugin 472A and widgets 476 from a content delivery network (e.g., software repository 170) responsive to receiving a response to a request to access a software application associated with a homepage of a document management platform. Command line interface 142 may request plugin 472A and widgets 476 based on configuration information associated with plugin 472A (e.g., plugin configuration information 474A) and widgets 476 (e.g., widget configuration information 478A).

Command line interface 142 may receive instructions from computing system 100 to generate contextual information based on configuration information associated with plugin 472A and widgets 476A. For example, command line interface 142 may generate contextual information that includes platform data. Command line interface 142 may generate contextual information that includes platform data, associated with a deployment environment the common knowledge base platform will send configuration information to, a browser with a command line interface to access and execute the software application, data of a user account associated with the requesting computing device, an authentication state of the requesting computing device, a language preference of a user operating the requesting computing device, font information for presenting an electronic document, a runtime widget hierarchy, and utilities provided by the common knowledge base platform. Command line interface 142 may execute plugin 472A based on the platform data to output a graphical user interface associated with a homepage of a document management platform.

Command line interface 142 may executed instructions received from computing system 100 to generate contextual information based on execution of plugin 472A. For example, command line interface 142 may execute instructions received from computing system 100 to generate contextual information that includes host data. Command line interface 142 may generate contextual information that includes host data that specifies widgets 476, as well as the corresponding dependency hierarchy. For example, command line interface 142 may generate contextual information that includes host data based on plugin configuration information 474A. Command line interface 142 may generate contextual information identifying routes for widget 476A and widget 476 based on plugin configuration 474A. Command line interface 142 may generate contextual information that includes host data based on widget configuration information 478A. For example, command line interface 142 may generate contextual information that includes host data identifying widget 476A as a parent widget and widget 476B as a dependency widget. Command line interface 142 may execute widgets 476 based on the host data included in the generated contextual information. In this way, command line interface 142 may be able to appropriately execute widgets 476, which have already been pre-loaded.

Figure 5:
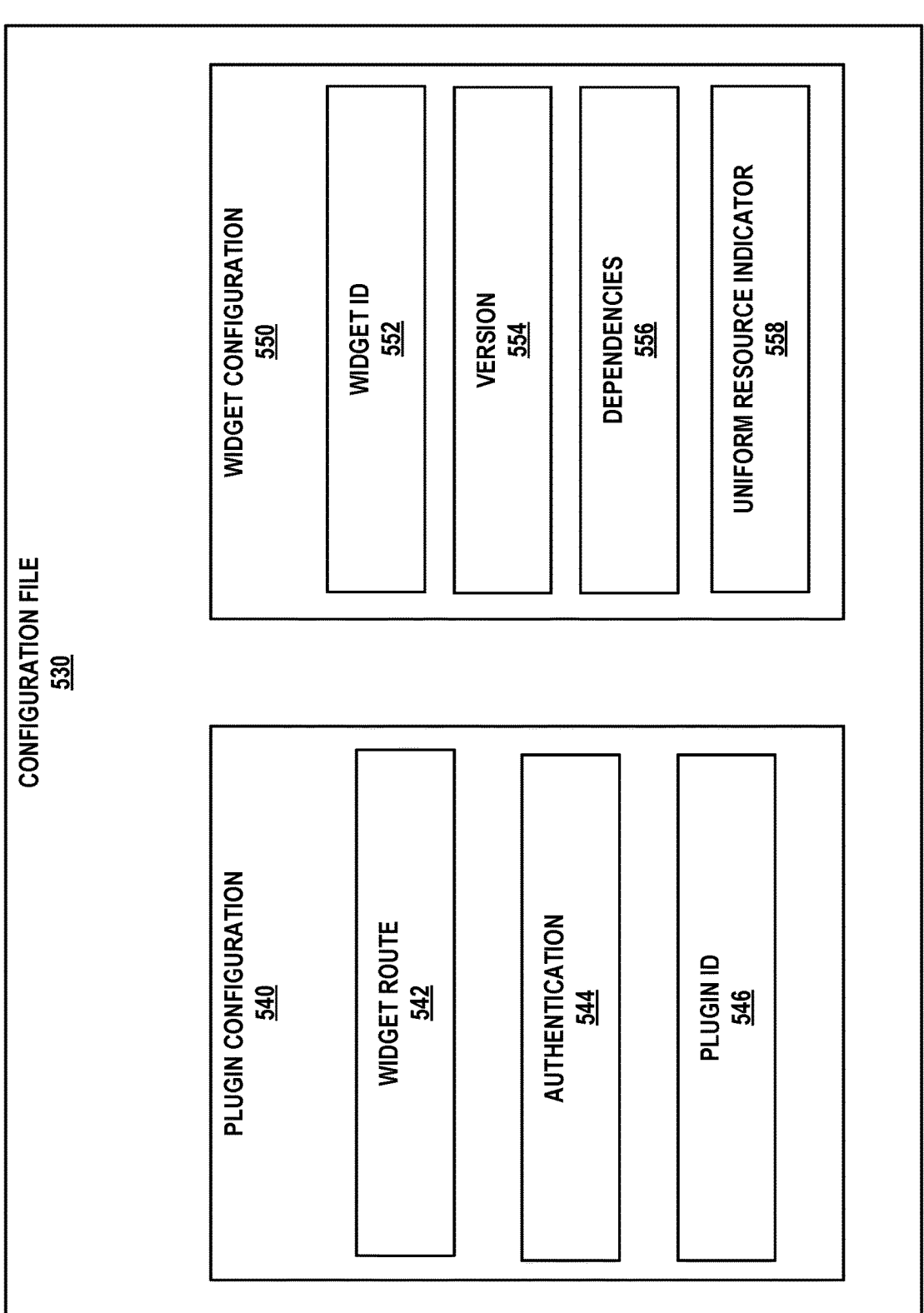
FIG. 5 is a conceptual diagram illustrating an example configuration file, in accordance with the techniques of this disclosure.

FIG. 5 is a conceptual diagram illustrating an example configuration file 530, in accordance with the techniques of this disclosure. In some instances, configuration file generator 208 of FIG. 3 may generate configuration file 530. Configuration file generator 208 may generate configuration file 530 in response to widget monitor 206 detecting a software application, or a new version thereof, associated with configuration file 530 has been uploaded.

In the example of FIG. 5, configuration file 530 may include configuration information for a software application uploaded to software repository 170 of FIG. 1, for example. Configuration file 530 may include plugin configuration 540 and widget configuration 550. Plugin configuration 540 may include configuration information corresponding to a plugin associated with a software application (e.g., plugins 472 of FIG. 4A). Widget configuration 550 may include configuration information corresponding to a utility widget (e.g., widgets 476A-476C of FIG. 4A) underlying functionality of the software application associated with configuration file 530.

Plugin configuration 540 may include configuration information of a plugin for a software application associated with configuration file 530. Plugin configuration 540 may include configuration information, such as widget route 542, authentication 544, and plugin identification (plugin ID) 546. An example of plugin configuration 540 is as follows:

```
{
    "route":          "/home",
    "authenticated":  {
                         "type": "SSO",
                         "clientId": "XYZ123"
                      },
    "pluginID":       "@home-team/app"
}
```

Plugin ID 546 may include configuration information specifying a reference to the plugin providing the user interface for the software application associated with configuration file 530. For example, plugin ID 546 may include a uniform resource indicator (e.g., uniform resource locator or URL) for the plugin associated with the software application. Plugin ID 546 may include the configuration information used by a requesting computing device to load the plugin for the software application associated with configuration file 530. Plugin ID 546 may include instructions for a requesting computing device to pull the plugin associated with plugin ID 546 from a software repository (e.g., software repository 170 of FIG. 1 or FIG. 2).

Authentication 544 may include configuration information indicating whether a requesting computing device has the appropriate credentials to access the software application associated with configuration file 530. In some instances, management controller 102 of FIGS. 1 and 2, for example, may provide instructions to a requesting computing device to input credentials to access the software application. Management controller 102 may receive the inputted credentials from the requesting computing device. Management controller 102 may verify whether the inputted credentials match credentials with access to the software application associated with configuration file 530. Authentication 544 may include configuration information associated with whether the inputted credentials have been verified. In some examples, authentication 544 may include a Boolean value indicating that a requesting computing device has provided the verified credentials to access the software application associated with configuration file 530.

Widget route 542 may include configuration information associated with references to utility widgets that include software code for processes that execute the software application associated with configuration file 530. Widget route 542 may be associated with a particular domain hosting the software application (e.g., domain.net). In some examples, widget route 542 may include uniform resource indicators (URIs) associated with each utility widget used to execute the software application. Widget route 542 may include a URI appending the domain hosting the software application (e.g., /widget). Widget route 542 may include a complete URI (e.g., uniform resource locator) to a utility widget associated with widget configuration 550, such as "domain-.net/widget."

Widget configuration 550 may include configuration information, such as widget identification (widget ID) 552, version 554, dependencies 556, and uniform resource indicator (URI) 558. An example of widget configuration 550 is as follows:

```
{
    "widgetID": "@prepare PDF/app",
    "version": "2.0.6"
    "metadata":                        {
        "dependsOn": ["@PDF viewer/app"]
        "URIs" : ["preload.html", "/api/me"]
                                       }
}
```

Widget ID 552 may be a tag or identifier for a utility widget associated with widget configuration 550. For example, widget ID 552 may be a tag assigned to the build artifact of the utility widget that was uploaded to a software repository (e.g., software repository 170 of FIG. 1 or FIG. 2). Version 554 may include configuration information associated with a version of the utility widget used to execute the software application associated with configuration file 530. In some instances, configuration file generator 208 of FIG. 3 may define version 554 based on whether configuration file 530 is a pre-deployment configuration file or a deployment configuration file. In examples where configuration file 530 is a pre-deployment configuration file, configuration file generator 208 may define version 554 based on a version of the utility widget that is undergoing pre-deployment testing (e.g., quality assurance and/or security testing). In examples where configuration file 530 is a deployment configuration file, configuration file generator 208 may define version 554 as a version of the utility widget that has satisfied quality assurance and security requirements.

Dependencies 556 may include configuration information identifying metadata specifying which, if any, utility widgets the utility widget associated with widget configuration 550 depends on. For example, widget configuration 550 may be associated with a utility widget, such as widget 476A of FIG. 4A. Widget configuration 550 may be associated with a utility widget that depends on another utility widget, such as widget 476A depending on widget 476B of FIG. 4A. In this example, dependencies 556 may include metadata identifying a reference to dependency widgets (e.g., widget 476B), as well as a version of the dependency widgets that widget 476A applies to execute processes of the software application associated with configuration file 530. Dependencies 556 may include a uniform resource indicator (e.g., uniform resource locator) associated with the version of widget 476B that widget 476A applies to execute the processes of the software application. In some examples, widget configuration 550 may not include dependencies 556 if the widget associated with widget configuration 550 does not depend on any other widgets.

URI 558 may include configuration information on how to access the utility widget associated with widget configuration 550 from a software repository (e.g., software repository 170 of FIG. 1 or FIG. 2). In some instances, URI 558 may represent the URL specified in widget route 542 of plugin configuration 540. URI 558 may also represent the URL included in a widget configuration for another utility widget that depends on the widget associated with widget configuration 550. In some examples, URI 558 may represent a website URL (e.g., "domain.net/plugin/widget") that may be used by a consumer computing device to load the plugin and embedded widget associated with widget configurations 550 from a content delivery network. URI 558 provides utility widget specific configuration information that allows software developers and consumers to access a particular version of a software application from a content delivery network based on a version specified in version 554. In this way, the common knowledge base platform as described herein (e.g., computing system 100 of FIGS. 1 and 2) may regulate deployment of various versions of software by intelligently sending configuration files specifying appropriate versions of widgets based on a requesting computing device. As discussed in more detail in FIG. 7B, computing system 100 may send a software developer computing device a pre-deployment configuration file that specifies untested versions of utility widgets for a requested software application, while sending consumer computing devices a deployment configuration file that specifies tested, stable versions of utility widgets for the requested software application.

Figure 6:
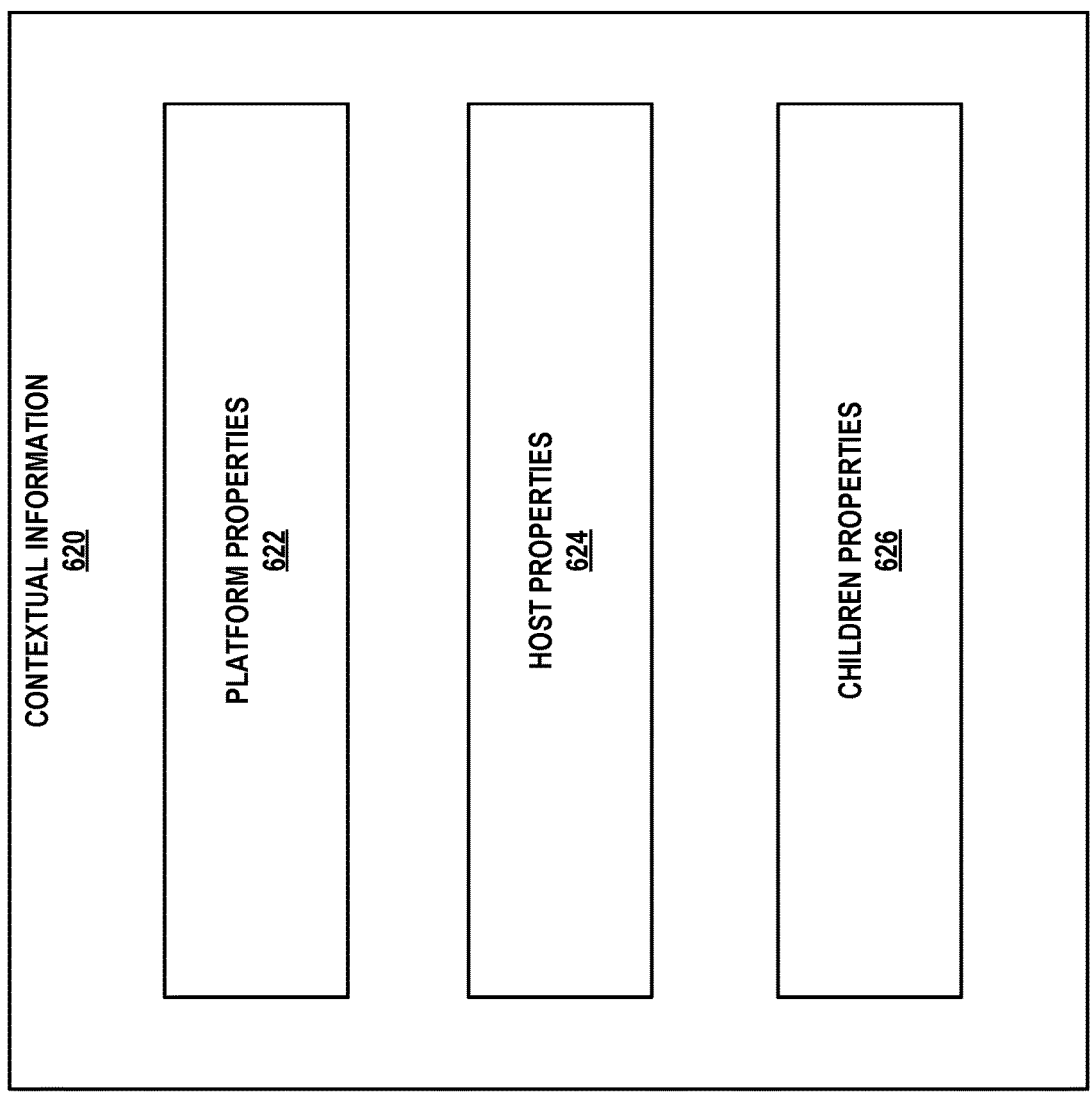
FIG. 6 is a conceptual diagram illustrating example contextual information used to load a software application, in accordance with the techniques of this disclosure.

FIG. 6 is a conceptual diagram illustrating example contextual information 620 used to load a software application, in accordance with the techniques of this disclosure. In some instances, contextual information 620 may be generated by command line interface 142 of client device 140, of FIG. 2. Command line interface 142 may generate contextual information 620 responsive to instructions from computing system 100 of FIGS. 1 and 2. Command line interface 142 may generate contextual information 620 based on received configuration information associated with a requested software application. For example, command line interface 142 may generate contextual information 620 based on a received configuration file (e.g., configuration file 530 of FIG. 5) associated with a requested software application.

Command line interface 142 may generate contextual information 620 based on plugin configuration 540, for example. Command line interface 142 may generate contextual information 620 based on a utility provided by the common knowledge base platform.

In the example of FIG. 6, contextual information 620 may include instructions to load widgets and data for a software application. Contextual information 620 may organize instructions to load widgets and data for a software application into domain properties. Contextual information 620 may include domain properties corresponding to a dependency hierarchy of a software application. For example, contextual information 620 may include platform properties 622, host properties 624, and children properties 626.

Platform properties 622 may include instructions to load a software application based on platform data of the requesting computing device. For example, platform properties 622 may include instructions to load the software application based on platform data associated with a deployment environment the common knowledge base platform will send configuration information to, a browser with a command line interface to access and execute the software application, data of a user account associated with the requesting computing device, an authentication state of the requesting computing device, a language preference of a user operating the requesting computing device, font information for presenting an electronic document, a runtime widget hierarchy, and utilities provided by the common knowledge base platform. In some examples, platform properties 622 may be generated based on plugin configuration information 540 of FIG. 5. In addition, command line interface 142 may alter the platform data included in platform properties 622. For example, command line interface 142 may specify font information for presenting an electronic document.

Host properties 624 may include instructions to load the software application based on a host widget. For example, host properties 624 may include instructions to load the software application based on contextual information associated with feature flags included in the host widget, a configuration API of the host widget, data used to execute the host widget, and dependent functions the host widget uses. For example, host properties 624 may include instructions based on host data that specifies a widget including processes for the software application. Host properties 624 may include instructions for command line interface 142 to load the widget (e.g., "PDF viewer" widget 476B of FIG. 4A), even before a user operating client device 140 executes the processes of the widget.

Host properties 624 may be generated based on widget configuration information 550 of FIG. 5. For example, host properties 624 may be generated to include instructions based on host data associated with dependent functions the host widget uses based on dependencies 556 of widget configuration 550, indicating where to access versions of utility widget a host widget depends on. Host properties 624 may be generated based on host data such as metadata specifying a host widget (e.g., plugin). In some instances, a host widget may be a plugin that exposes an API for other widgets to apply in processes for the software application. Host properties 624 may allow the other widgets to use the API exposed by the host widget by including configuration, bootstrapping, and initialization information of the API.

Children properties 626 may include instructions to load the software application based on children widgets used by a host widget. For example, children properties 626 may include instructions to load the software application based on children data associated with a host widget using a child widget as a wrapper or a high order component (HOC). Children properties 626 may be generated based on widget configuration information 550 of FIG. 5. For example, children properties 626 may be generated to include instructions based on contextual information associated with dependent functions the host widget uses based on dependencies 556 of widget configuration 550, indicating where to access versions of utility widget a host widget depends on.

Contextual information 620 may allow a requesting computing device to load all widgets and data associated with a software application in parallel. In typical deployment schemes, a requesting computing device loads widgets and data sequentially by making requests to access software and data in a sequential order. Contextual information 620, rather provides properties of the software application based on various domains with instructions for the requesting computing device to load all widgets and data specified in contextual information 620 at one time. Contextual information 620 includes instructions to quickly load all components of a software application to provide a user of the requesting computing device a seamless experience executing various processes included in the software application.

Figure 7A:
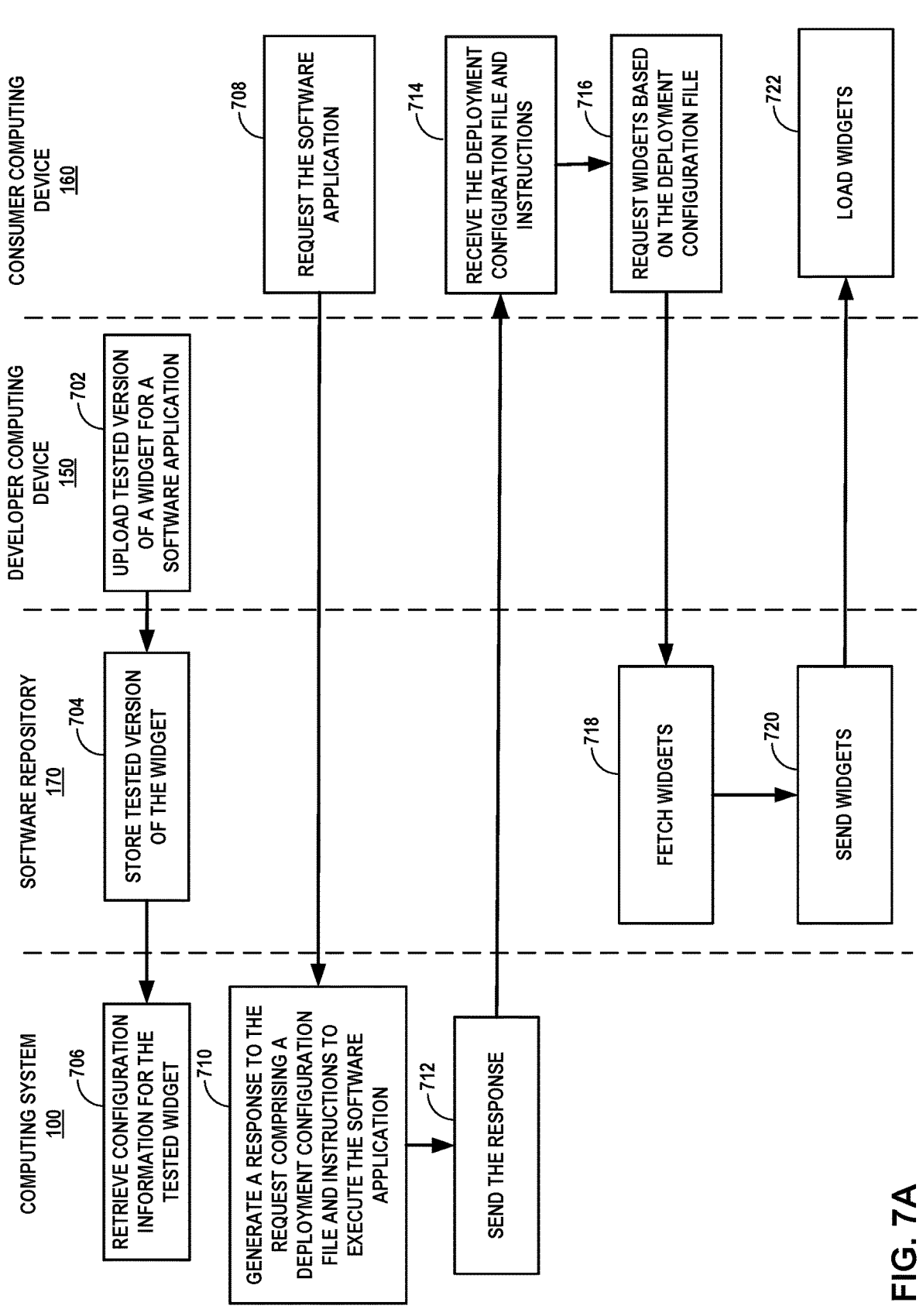
FIGS. 7A and 7B are a flowcharts illustrating example modes of operation for managing deployment of software applications, in accordance with the techniques of this disclosure.

FIG. 7A is a flow chart illustrating an example mode of operation for managing deployment of software applications, in accordance with the techniques of this disclosure. FIG. 7A is discussed with FIGS. 1-6 for example purposes only. In the example of FIG. 7A, computing system 100, software repository 170, developer computing device 150, and consumer computing device 160 may correspond to computing system 100, software repository 170, developer computing device 150 and consumer computing device 160 of FIG. 1.

Developer computing device 150 may upload a tested version of a widget for a software application to software repository 170 (702). Developer computing device 150 may upload a tested version of a widget that was tested using pre-deployment utilities provided by computing system 100. Developer computing device 150 may test a version of a widget with pre-deployment testing (e.g., quality assurance and/or security testing). Developer computing device 150 may upload a tested version of the widget for the software application to software repository 170 in response to the version of the widget satisfying pre-deployment testing requirements. Developer computing device 150 may upload the tested version of the widget with a command line interface (e.g., command line interface 152). In some instances, command line interface 152 may upload the tested version of the widget using a utility provided by computing system 100. Command line interface 152 may use the utility to upload a build artifact that converts a tested version of the widget into a standardized format. Command line interface 152 may send the build artifact of the tested version of the widget to software repository 170 via network 101. Software repository 170 may store the tested version of the widget for the software application (704). Software repository 170 may accordingly store the build artifact of the tested version of the widget to help to ensure that all software applications stored on software repository 170 are compatible.

Computing system 100 may retrieve configuration information for the tested version of the widget for the software application (706). In some instances, management controller 102 may retrieve the configuration information for the tested version of the widget. For example, widget monitor 206 of management controller 102 may continuously poll software repository 170 for new versions of the widget. In response to widget monitor 206 detecting software repository 170 has stored the tested version of the widget, widget monitor 206 may retrieve the configuration information associated with the tested version of the widget. In some examples, configuration file generator 208 of management controller 102 may generate a deployment configuration file associated with the software application that includes the tested version of the widget. Configuration file generator 208 may generate a deployment configuration file such as configuration file 530 of FIG. 5.

In the example of FIG. 7A, consumer computing device 160 may request access to the software application (708). Consumer computing device 160 may request access to the software application using command line interface 162.

Consumer computing device 160 may be a consumer computing device requesting access to the software application to manage electronic documents. Computing system 100 may receive the request to access the software application. Computing system may receive the request to access the software application with API Gateway 220. Computing system 100 may generate a response to the request (710). Computing system 100 may generate a response to the request that includes the deployment configuration file for the software application that includes the tested version of the widget. Computing system 100 may also generate a response to the request that includes instructions to execute the software application. Computing system 100 may send the response to consumer computing device 160 (712). Consumer computing device 160 may receive the response with the deployment configuration file and instructions to execute the software application (714). Consumer computing device 160 may receive the response with command line interface 162. Consumer computing device 160 may receive the response that includes the configuration information associated with the software application and the tested version of the widget. Consumer computing device 160 may also receive instructions to execute the software application.

Consumer computing device 160, or more particularly command line interface 162, may request widgets for the software application based on the deployment configuration file and instructions received from computing system 100 (716). Consumer computing device 160 may send the request to software repository 170 via network 101, for example. Consumer computing device 160 may send a request to fetch widgets based on reference indications (URIs or URLs) included in the deployment configuration file. Software repository 170 may fetch the widgets based on the request sent from consumer computing device 160 (718). Software repository 170 may fetch the widgets for the software application based on the reference indications included in the request sent by consumer computing device 160. Software repository 170 may send consumer computing device 160 the widgets for the software application (720). Software repository 170 may send the widgets to consumer computing device 160 via network 101. Consumer computing device 160 may load the received widgets (722). Consumer computing device 160 may load and execute the received widgets according to the instructions received from computing system 100.

Figure 7B:
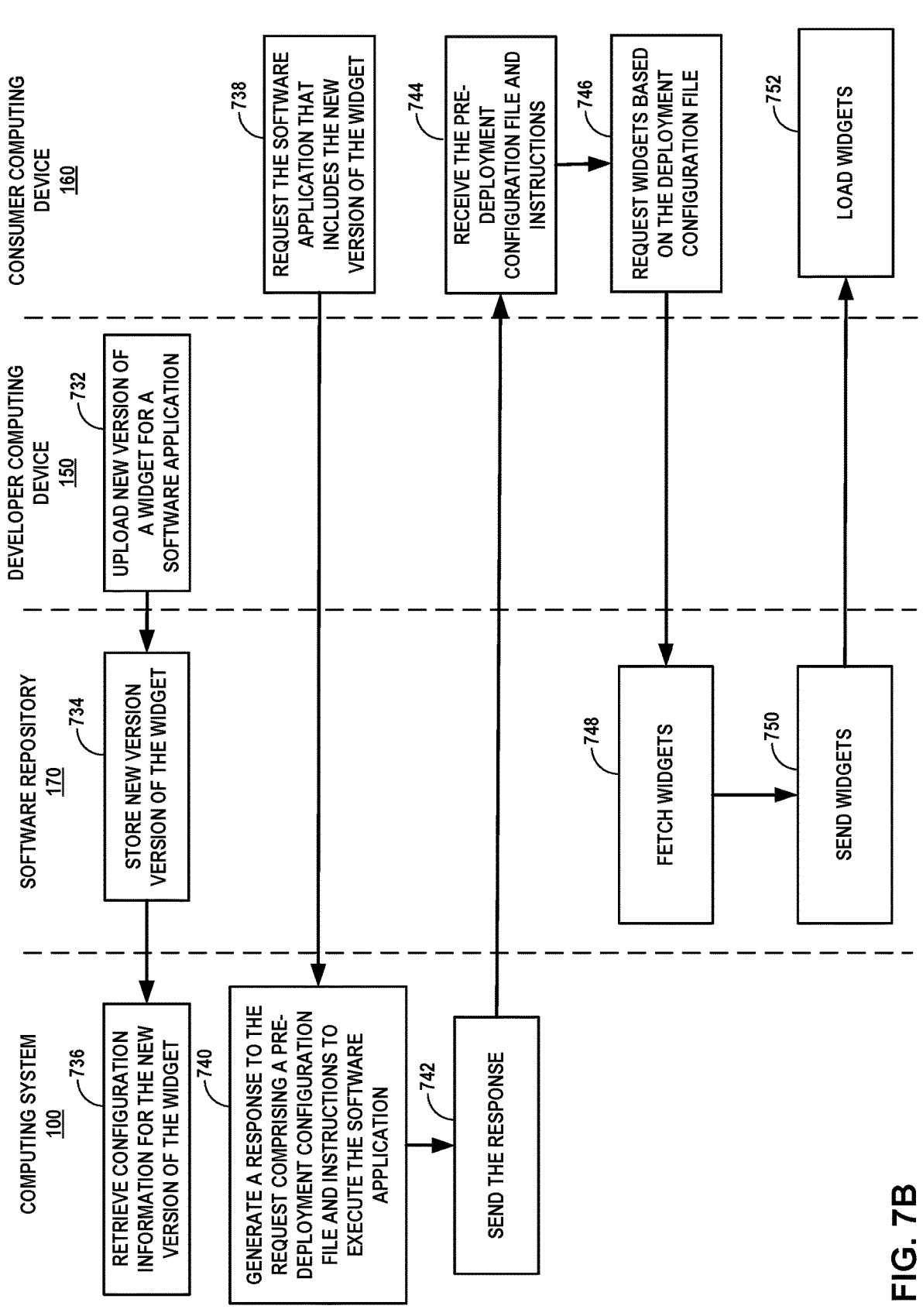

FIG. 7B is a flow chart illustrating an example mode of operation for managing deployment of software applications, in accordance with the techniques of this disclosure. FIG. 7B is discussed with FIGS. 1-6 for example purposes only. In the example of FIG. 7B, computing system 100, software repository 170, developer computing device 150, and consumer computing device 160 may correspond to computing system 100, software repository 170, developer computing device 150 and consumer computing device 160 of FIG. 1.

Developer computing device 150 may upload a new version of a widget for a software application to software repository 170 (732). Developer computing device 150 may upload a new version of a widget that has not been tested using pre-deployment utilities provided by computing system 100. Developer computing device 150 may upload the new version of the widget with a command line interface (e.g., command line interface 152). In some instances, command line interface 152 may upload the new version of the widget using a utility provided by computing system 100. Command line interface 152 may use the utility to upload a build artifact that converts a new version of the widget into a standardized format. Command line interface 152 may send the build artifact of the new version of the widget to software repository 170 via network 101. Software repository 170 may store the new version of the widget for the software application (734). Software repository 170 may accordingly store the build artifact of the new version of the widget to help to ensure that all software applications stored on software repository 170 are compatible.

Computing system 100 may retrieve configuration information for the new version of the widget for the software application (706). In some instances, management controller 102 may retrieve the configuration information for the new version of the widget. For example, widget monitor 206 of management controller 102 may continuously poll software repository 170 for new versions of the widget. In response to widget monitor 206 detecting software repository 170 has stored the new version of the widget, widget monitor 206 may retrieve the configuration information associated with the new version of the widget.

In the example of FIG. 7A, consumer computing device 160 may request the software application that includes the new, untested version of the widget (738). Consumer computing device 160 may request access to the software application using shell interface 162. Consumer computing device 160 may be a consumer computing device requesting access to the software application to manage electronic documents. Computing system 100 may receive the request to access the software application. Computing system may receive the request to access the software application with API Gateway 220. Computing system 100 may generate a response to the request (740). For example, in response to a request from consumer computing device 160 to access the software application that includes the new version of the widget, configuration file generator 208 of management controller 102 may generate a pre-deployment configuration file associated with the software application that includes the new version of the widget. Configuration file generator 208 may generate a pre-deployment configuration file such as configuration file 530 of FIG. 5. Computing system 100 may generate a response to the request that includes the deployment configuration file for the software application that includes the tested version of the widget. Computing system 100 may also generate a response to the request that includes instructions to execute the software application. Computing system 100 may send the response to consumer computing device 160 (742). Consumer computing device 160 may receive the response with the deployment configuration file and instructions to execute the software application (714).

Consumer computing device 160, or more particularly shell interface 162, may request widgets for the software application based on the deployment configuration file and instructions received from computing system 100 (746). Consumer computing device 160 may send the request to software repository 170 via network 101, for example. Consumer computing device 160 may send a request to fetch widgets based on reference indications (URIs or URLs) included in the deployment configuration file. Software repository 170 may fetch the widgets based on the request sent from consumer computing device 160 (748). Software repository 170 may fetch the widgets for the software application based on the reference indications included in the request sent by consumer computing device 160. Software repository 170 may send consumer computing device 160 the widgets for the software application (750). Software repository 170 may send the widgets to consumer computing device 160 via network 101. Consumer computing device 160 may load the received widgets (752). Consumer computing device 160 may load and execute the received widgets according to the instructions received from computing system 100.

Figure 8:
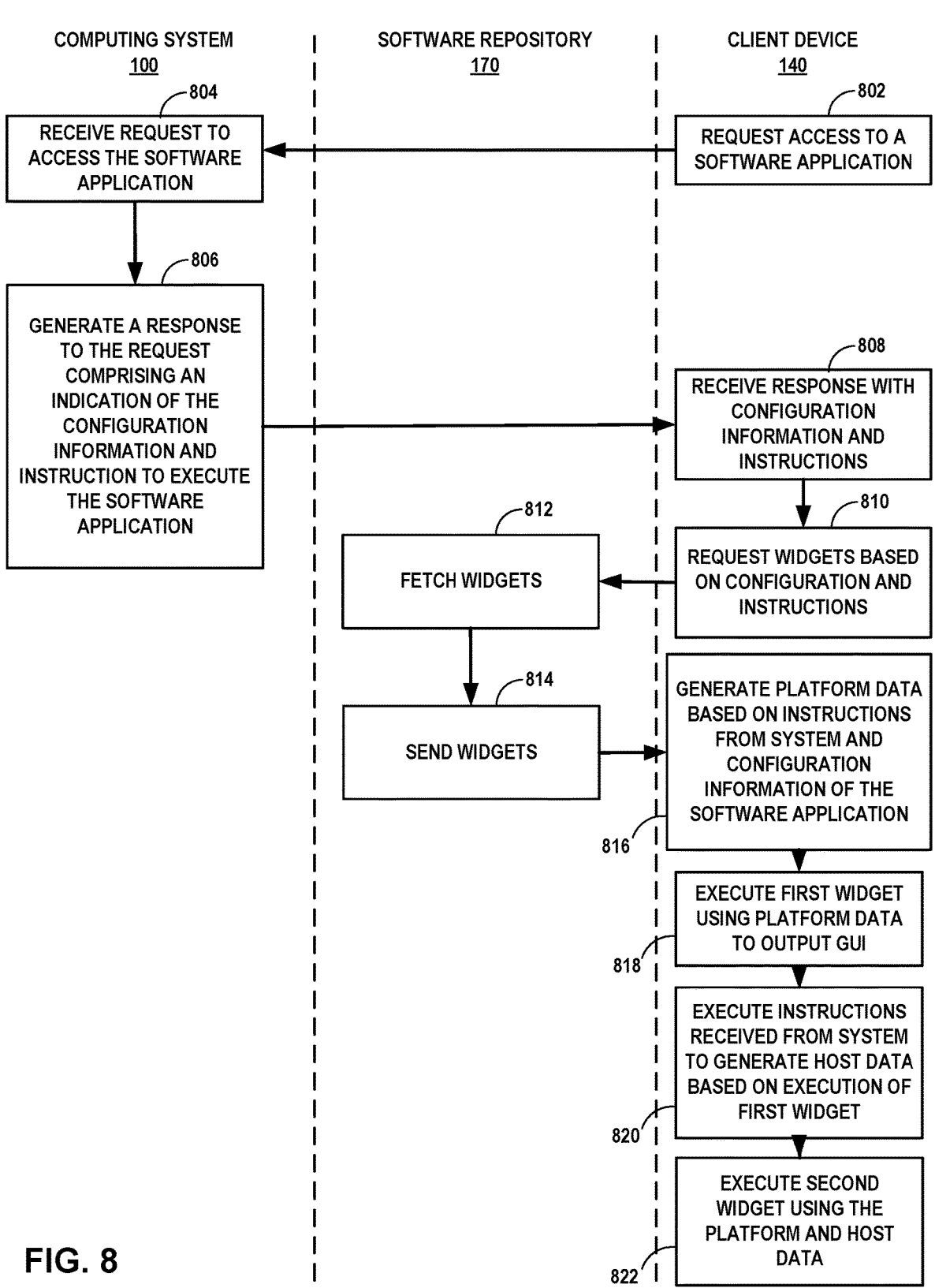
FIG. 8 is a flowchart illustrating an example mode of operation for managing execution of a software application, in accordance with the techniques of this disclosure.

FIG. 8 is a flowchart illustrating an example mode of operation for managing execution of a software application, in accordance with the techniques of this disclosure. FIG. 8 is discussed with FIGS. 1-6 for example purposes only. In the example of FIG. 8, computing system 100, software repository 170, and client device 140 may correspond to computing system 100, software repository 170, and client device 140 of FIG. 2.

Client device 140 may request access to a software application (802). Client device 140, or more specifically command line interface 142, may send an API request to API Gateway of computing system 100. Client device 140 may request either a tested or untested version of widgets included in the software application. Management controller 102 of computing system 100 may receive a request from computing device 140 to access the software application (804). Management controller 102 may receive the request to access the software application with API Gateway 220. Deployment module 210 of management controller 102 may generate a response to the request for the software application (806). Deployment module 210 may generate a response comprising an indication of the retrieved configuration information for the software application. Deployment module 210 may also generate a response comprising instructions configured to cause computing device 140 to request, from software repository 170, the plurality of widgets specified in the retrieved configuration information. Deployment module 210 may output the response to client device 140 to provide the software application at client device 140. Client device 140 may receive the response with the configuration information and instructions to execute the software application (808).

Client device 140, or more command line interface 142, may request widgets for the software application based on the configuration information and instructions received from computing system 100 (810). Client device 140 may send the request to software repository 170 via network 101, for example. Client device 140 may send a request to fetch widgets based on reference indications (URIs or URLs) included in the configuration information received from computing system 100. Software repository 170 may fetch the widgets based on the request sent from client device 140 (812). Software repository 170 may fetch the widgets for the software application based on the reference indications included in the request sent by client device 140. Software repository 170 may send client device 140 the widgets for the software application (814). Software repository 170 may send the widgets to client device 140 via network 101.

Client device 140 may generate platform data based on instructions received from computing system 100 and the configuration information received from computing system 100 (816). Client device 140 may execute a first widget (e.g., plugin) using the platform data to output a graphical user interface (GUI) (818). For example, client device 140 may execute a plugin to output a GUI according to platform data specifying font information for presenting an electronic document. Client device 140 may execute instructions received from computing system 100 to generate host data based on execute on the first widget (820). For example, client device 140 may generate host data that identifies a utility widget dependency tree. Client device 140 may execute the second widget using the platform data and host data (822). For example, client device 140 may execute the second widget using platform data specifying font information for presenting an electronic document and according to a utility widget dependency tree specified in the generated host data. Client device 140 may store the platform data and host data as contextual information (e.g., contextual information 620 of FIG. 6) to allow client device 140 to appropriately execute pre-loaded widgets. Client device 140 may load all widgets received from software repository 170 while executing the widgets according to contextual information generated via instructions received from computing system 100. Rather than a developer having to define dependencies and implement dependency widgets at build time, computing system 100 allows client device 140 to implement dependency widgets during runtime based on configuration information associated with the software application. In this way, computing system 100 sends instructions to client device 140 that improves a user's experience using the requested software application.

FIG. 9 is a flow chart illustrating an example mode of operation for managing deployment of software applications, in accordance with the techniques of this disclosure. FIG. 8 is discussed with FIGS. 1-7 for example purposes only.

Computing system 100 may retrieve configuration information for a software application from software repository 170 (902). Computing system 100, and more particularly, for example, management controller 102, may retrieve configuration information for a software application for managing an electronic document. Management controller 102 may retrieve configuration information specifying a plurality of widgets for deploying the software application. For example, management controller 102 may retrieve configuration information that indicates an identification of the widget, a version of the widget, and a uniform resource indicator associated with the software application. In some examples, the configuration information may indicate at least one dependency widget to be used by the widget. The configuration information may include configuration information for a plugin used in the software application. Management controller 102 may retrieve configuration information for a plugin that may indicates a route to the plurality of widgets used to execute the software application, an authentication state of the client device, and an identifier for the plugin. In some examples, widget monitor 206 of management controller 102 may retrieve configuration information after periodically polling software repository 170 for an uploaded software application, or new versions thereof. Widget monitor 206 may retrieve the configuration information with API Gateway 220.

Management controller 102 of computing system 100 may receive a request from computing device 140 to access the software application (904). Management controller 102 may receive the request to access the software application with API Gateway 220. Deployment module 210 of management controller 102 may generate a response to the request for the software application (906). Deployment module 210 may generate a response comprising an indication of the retrieved configuration information for the software application. Deployment module 210 may also generate a response comprising instructions configured to cause computing device 140 to request, from software repository 170, the plurality of widgets specified in the retrieved configuration information. Deployment module 210 may output the response to client device 140 to provide the software application at client device 140 (908). Deployment module 210 may output the response to client device 140 via network 101. Deployment module 210 may output a response to client device 140 that is configured to cause client device 140 to request dependency widgets from software repository 170 based on configuration information indicating the dependency widgets.

FIG. 10 is a flow chart illustrating an example mode of operation for loading a software application according to contextual information. FIG. 10 is discussed with FIGS. 1-6 for example purposes only.

Computing system 100 may retrieve configuration information for a software application from software repository 170 (910). In some examples, computing system 100 may retrieve configuration information specifying a first widget and a second widget. Computing system 100 may generate a configuration file based on the configuration information for the software application. Computing system 100 may receive a request from computing device 140 to execute a software application (912). Computing system 100, and more particularly management controller 102, may receive a request from computing device 140 to execute a software application for managing an electronic document. Management controller 102 may receive a request to execute a software application that is configured to execute using at least a first widget and a second widget. Management controller 102 may receive the request with API Gateway 220.

Management controller 102 may generate instructions for executing the software application at computing device 140 (914). Management controller 102 may generate instructions for executing the software application at computing device 140 based on the first widget comprising instructions to initiate an execution of the second widget based on the first widget. Management controller 102 may generate instructions for executing the software application at the client device based on the configuration information management controller 102 retrieved from software repository 170. For example, management controller 102 may generate instructions for computing device 140 to generate contextual information 620 of FIG. 6. Management controller 102 may include instructions for executing the software application based on contextual information included in host properties 624. Host properties 624 may include contextual information of the first widget that comprises instructions to execute the second widget, in which the processes of the first widget depend on. Host properties 624 may include host data that specifies data associated with the first widget. Host properties 624 may be configured to instruct computing device 140 to execute a portion of the software application using the host data. Management controller 102 may output the instructions to execute the software application to computing device 140 (916). Management controller 102 may output the instructions via network 101. Computing device 140 may receive the instructions with command line interface 142. Command line interface 142 may generate contextual information 620 based on the received instructions. Command line interface may then request widgets and data used to execute the software application from software repository 170 based on contextual information 620.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

The invention claimed is:

1. A system for deploying a software application associated with document management, the system comprising processing circuitry implemented by one or more processors, the processing circuitry having access to a memory and configured to:

receive a request, from a client device, to execute a software application for managing an electronic document, wherein the software application is configured to execute using at least a first widget and a second widget;

retrieve, from a software repository, configuration information for the software application, the configuration information specifying the first widget and the second widget;

generate a configuration file based on the configuration information for the software application;

generate, based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget; and output, to the client device, the instructions to execute the software application for managing the electronic document.

2. The system of claim 1, wherein the first widget comprises a plugin configured to provide a graphical user interface for the software application and wherein the contextual information is generated based on plugin configuration information.

3. The system of claim 1, wherein the contextual information comprises host data, wherein the host data specifies data associated with the first widget and wherein the second widget is configured to execute a portion of the software application using the host data.

4. The system of claim 1, wherein the contextual information comprises platform data, wherein the second widget is configured to execute a portion of the software application using the platform data.

5. The system of claim 4, wherein the platform data specifies font information for presenting an electronic document.

6. The system of claim 1, wherein the contextual information comprises children data, wherein the second widget is configured to execute as a wrapper of the first widget, and wherein the children data specifies the wrapper.

7. The system of claim 1, wherein the client device executes the software application by requesting the first widget and second widget from the software repository based on the contextual information of the first widget and the contextual information of the second widget.

8. The system of claim 1, wherein the processing circuitry is further configured to generate the instructions for executing the software application at the client device based the configuration file.

9. The system of claim 1, wherein the one or more processors are further configured to provide a utility for the client device to generate the contextual information for the first widget and the contextual information for the second widget.

10. A method for deploying a software application associated with document management comprising:

receiving a request, by processing circuitry implemented using one or more processors and from a client device, to execute a software application for managing an electronic document, wherein the software application is configured to execute using at least a first widget and a second widget;

retrieving, by the processing circuitry and from a software repository, configuration information for the software application, the configuration information specifying the first widget and the second widget;

generating, by the processing circuitry, a configuration file based on the configuration information for the software application;

generating, by the processing circuitry and based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget; and outputting, by the processing circuitry and to the client device, the instructions to execute the software application for managing the electronic document.

11. The method of claim 10, wherein the first widget comprises a plugin configured to provide a graphical user interface for the software application and wherein the contextual information is generated based on plugin configuration information.

12. The method of claim 10, wherein the contextual information comprises host data, wherein the host data specifies data associated with the first widget and wherein the second widget is configured to execute a portion of the software application using the host data.

13. The method of claim 10, wherein the contextual information comprises platform data, wherein the second widget is configured to execute a portion of the software application using the platform data.

14. The method of claim 13, wherein the platform data specifies font information for presenting an electronic document.

15. The method of claim 10, wherein the contextual information comprises children data, wherein the second widget is configured to execute as a wrapper of the first widget, and wherein the children data specifies the wrapper.

16. The method of claim 10, wherein the client device executes the software application by requesting the first widget and second widget from the software repository based on the contextual information of the first widget and the contextual information of the second widget.

17. The method of claim 10, wherein the processing circuitry generates instructions for executing the software application at the client device based on the configuration file.

18. The method of claim 10, further comprising providing a utility for the client device to generate the contextual information for the first widget and the contextual information for the second widget.

19. Non-transitory computer-readable storage media comprising instructions that, when executed, cause processing circuitry to:

receive a request, from a client device, to execute a software application for managing an electronic document, wherein the software application is configured to execute using at least a first widget and a second widget;

retrieve, from a software repository, configuration information for the software application, the configuration information specifying the first widget and the second widget;

generate a configuration file based on the configuration information for the software application;

generate, based on the first widget comprising instructions to initiate an execution of the second widget, instructions for executing the software application at the client device, wherein the instructions are configured to cause the client device to generate contextual information for the first widget and wherein the second widget causes the client device to load the contextual information when executing the second widget; and output, to the client device, the instructions to execute the software application for managing the electronic document.

20. The non-transitory computer-readable storage media of claim 19, wherein the first widget comprises a plugin configured to provide a graphical user interface for the software application and wherein the contextual information is generated based on plugin configuration information.

* * * * *